United States Patent
Iguchi et al.

(10) Patent No.: US 11,726,192 B2
(45) Date of Patent: Aug. 15, 2023

(54) PHOTORECEPTOR, FLIGHT TIME MEASUREMENT DEVICE, AND OPTICAL RADAR

(71) Applicant: SHARP KABUSHIKI KAISHA, Osaka (JP)

(72) Inventors: Katsuji Iguchi, Sakai (JP); Hidenori Kawanishi, Sakai (JP); Koji Takahashi, Sakai (JP); Noriaki Fujii, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 1196 days.

(21) Appl. No.: 16/208,386

(22) Filed: Dec. 3, 2018

(65) Prior Publication Data

US 2019/0170866 A1  Jun. 6, 2019

(30) Foreign Application Priority Data

Dec. 5, 2017 (JP) ................................. 2017-233624

(51) Int. Cl.
| | |
|---|---|
| *G01S 7/499* | (2006.01) |
| *G01S 7/4863* | (2020.01) |
| *G01S 7/484* | (2006.01) |
| *G01S 17/10* | (2020.01) |
| *G01S 7/481* | (2006.01) |

(52) U.S. Cl.
CPC .............. *G01S 7/499* (2013.01); *G01S 7/484* (2013.01); *G01S 7/4812* (2013.01); *G01S 7/4863* (2013.01); *G01S 17/10* (2013.01); *G01S 7/4817* (2013.01)

(58) Field of Classification Search
CPC ........ G01S 7/481; G01S 7/4811; G01S 7/484; G01S 7/486; G01S 7/4863; G01S 7/4865; G01S 7/491; G01S 7/4911; G01S 7/4912; G01S 7/4913; G01S 7/4914; G01S 7/4915; G01S 7/499; G01S 17/04; G01S 17/06; G01S 17/08; G01S 17/10; G01S 7/4812; G01S 7/4817
See application file for complete search history.

(56) References Cited

U.S. PATENT DOCUMENTS

| | | | |
|---|---|---|---|
| 6,133,989 A | 10/2000 | Stettner et al. | |
| 6,636,300 B2* | 10/2003 | Doemens | ................ G01S 7/481 |
| | | | 356/5.1 |
| 2002/0003617 A1* | 1/2002 | Doemens | ................ G01S 17/89 |
| | | | 356/4.01 |

(Continued)

FOREIGN PATENT DOCUMENTS

| | | | |
|---|---|---|---|
| CN | 104777486 A | * | 7/2015 |
| CN | 104777486 A | * | 7/2015 |

(Continued)

*Primary Examiner* — Luke D Ratcliffe
(74) *Attorney, Agent, or Firm* — ScienBiziP, P.C.

(57) ABSTRACT

A photodetector measures flight time by an imaging optical element imaging reflected light from an illuminated illumination region of an object illuminated by pulse light, and a light detection portion receiving the imaged light. The light detection portion is formed larger than a projection region reflected at the illumination region of the object and imaged on the light detection portion. In the light detection portion, a portion overlaying the projection region is activated as a light-detection region.

9 Claims, 26 Drawing Sheets

(56) References Cited

U.S. PATENT DOCUMENTS

| | | | |
|---|---|---|---|
| 2002/0196424 A1 | 12/2002 | Sano et al. | |
| 2010/0020306 A1 | 1/2010 | Hall | |
| 2011/0216304 A1 | 9/2011 | Hall | |
| 2015/0316650 A1 | 11/2015 | Imai | |
| 2018/0143301 A1* | 5/2018 | Badoni | G01S 7/484 |
| 2018/0152691 A1* | 5/2018 | Pacala | G01S 17/89 |
| 2019/0011567 A1* | 1/2019 | Pacala | H01L 31/02027 |
| 2019/0094391 A1 | 3/2019 | Nishihara et al. | |

FOREIGN PATENT DOCUMENTS

| | | | |
|---|---|---|---|
| CN | 107656284 A * | 2/2018 | |
| EP | 2708914 A1 | 3/2014 | |
| JP | 2003004850 A | 1/2003 | |
| JP | 2007108129 A | 4/2007 | |
| JP | 2011-021980 A | 2/2011 | |
| JP | 2014059301 A | 4/2014 | |
| JP | 2014077658 A | 5/2014 | |
| JP | 2015117970 A | 6/2015 | |
| JP | 2015212647 A | 11/2015 | |
| JP | 2016-161438 A | 9/2016 | |
| JP | 2016188808 A | 11/2016 | |
| WO | 2008/008970 A2 | 1/2008 | |
| WO | 2011/146523 A2 | 11/2011 | |
| WO | 2017/183481 A1 | 10/2017 | |

* cited by examiner

Z AXIS ⊙ → Y AXIS

↓

X AXIS

FIG. 22A
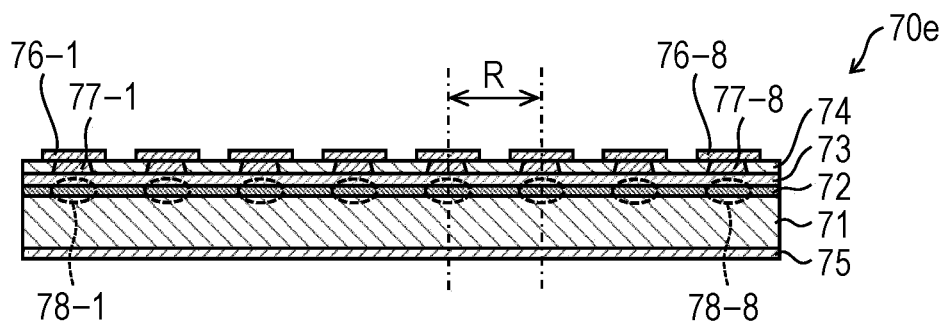
FIG. 22B
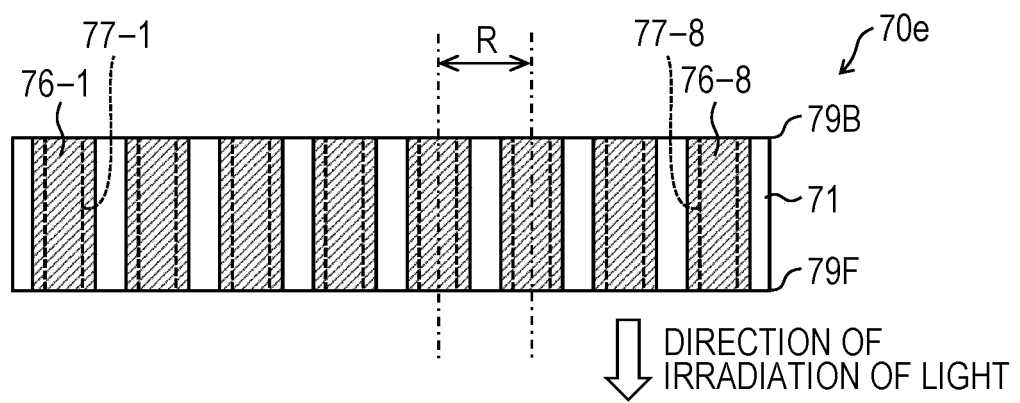
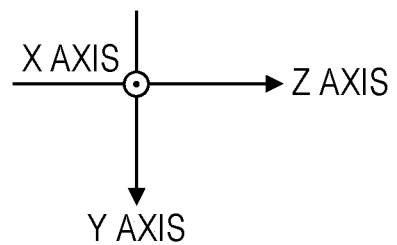

FIG. 28

PHOTORECEPTOR, FLIGHT TIME MEASUREMENT DEVICE, AND OPTICAL RADAR

BACKGROUND

1. Field

The present disclosure relates to an optical radar that measures distance to an object, a flight time measurement device used in the same, and a photodetector used in the same.

2. Description of the Related Art

Three-dimensional imaging is a concept that includes, in addition to normal two-dimensional imaging of photographs and so forth, information of distance to an object within a field of view, and application of peripheral recognition in automobiles, robots, and so forth, is spreading in recent years. A method of emitting a laser light and measuring the flight time (time-of-flight) until the laser light reflects off an of and returns is becoming common place as a high-precision distance information measurement method.

Methods of emitting a laser light toward a field of view include rotation systems where a laser light (spot beam) collimated to approximately parallel and emitted within a narrow range is rotated integrally with a light receiving device (see International Publication No. 2008/008970 (published Jan. 17, 2008) and International Publication. No. 2011/146523 (published Nov. 24, 2011)), a scanning type where scanning by a spot beam is performed using a mirror or the like (Japanese Unexamined Patent Application Publication No. 2011-21980 (published Feb. 3, 2011)), and single-emission type where a laser light is spread generally uniformly over the entire field of view and emitted (U.S. Pat. No. 6,133,989 (Published Oct. 17, 2000)).

The single-emission type is readily reduced in size since et uses no mechanical configuration, but the laser light intensity at the object is weaker as compared to the scanning type. Accordingly, when the distance to the object is long, signal intensity becomes weak, and ranging precision drops. On the other hand, light emission intensity is improved by the line-shaped laser light and scanning in only one direction (Japanese Unexamined Patent Application Publication No. 2016-161438) as compared to single-emission, but is still insufficient. However, many spot-beam scanning devices where a strong beam intensity can readily be obtained at the object have been developed as devices for measuring long distances such as 50 to 200 meters. Conversely, rotation systems using multiple laser light sources and multiple photodetectors corresponding thereto in a one-on-one basis (see International Publication No. 2008/008970 (published Jan. 17, 2008) and International Publication No. 2011/146523 (published Nov. 24, 2011)) are most widely used in recent years.

However, the above-described conventional optical radar devices have not been able to realize an optical radar device that can efficiently measure long distances and that also is inexpensive, due to the following reasons. That is to say, optical radar devices generally include a flight time measurement device that emits a pulse light to an object, receives the reflected light therefrom, measures the flight time (time-of-flight (ToF)), and measures the distance to the object. In automotive applications, flight time measurement devices have to operate even under midday sunlight at the equator, and extending the maximum ranging distance under intense background light is an issue.

The illumination intensity of light on the face of an object at a distance decreases in inverse proportion to the distance squared. Accordingly, in order to extend the maximum ranging distance, the intensity ratio as to background light has to be increased as much as possible, taking only the region illuminated by pulse light (illumination region) as the object of measurement.

Generally, at long distances the illumination region is decided by the size of the near-field light-emission region of: the semiconductor element emitting pulse light, and the focal distance of the collimator lens, so there is little room for adjustment. Accordingly, a photodetector making up the flight time measurement device has to take only a projection portion where the illumination region is imaged on the photodetector by an imaging optical element, as a light-detection region. However, assembly of the flight time measurement device involves error, and there is variance in the relative positions of the photodetector and light emitter. In order to make up for this variance, either the light-detection region has to be widened to secure a large margin, or the margin has to be minimized by increasing assembly precision.

Of these, the former exhibits lower S/N ratio due to increase in the amount of background light, and the maximum ranging distance becomes shorter. On the other hand, the later increases assembly costs. There is no photodetector currently available that can increase the maximum flight distance while reducing manufacturing costs. Accordingly, there is demand for a photodetector where the maximum ranging distance can be increased even if there is great manufacturing variance.

It is desirable to realize a photodetector that realizes a light-detection region suitable for an illumination region of pulse light while markedly relaxing positioning precision of the photodetector as to a light emitter, accordingly realizing a flight time measurement device capable of reducing costs without reducing maximum ranging distance, thus realizing an inexpensive optical radar device with extended maximum ranging distance.

SUMMARY

According to an aspect of the disclosure, there is provided a photodetector to measure flight time by detecting reflected light from an illumination region of an object illuminated by pulse light, where the reflected light is focused on a light detection portion of the photodetector by an imaging optical element. The light detection portion is formed larger than a projection region reflected at the illumination region of the object and imaged on the light detection portion in the light detection portion, a portion overlaying the projection region is activated as a light-detection region.

According to an aspect of the disclosure, there is provided a flight time measurement device including at least a pulse emitter, a polarizing beam splitter, an imaging optical element, and the photodetector. The pulse emitter causes pulse light to pass through the polarizing beam splitter and the imaging optical element in that order and illuminate an object. Reflected light from the object passes through the imaging optical element and polarizing beam splitter in that order and is imaged at the photodetector. The pulse emitter and the photodetector are each disposed at a focal position on one side of the imaging optical element.

According to an aspect of the disclosure, there is provided a flight time measurement device including at least a pulse emitter, a collimation lens, a polarizing beam splitter, an imaging optical element, and the photodetector. The pulse emitter causes pulse light to pass through the collimation lens and the polarizing beam splitter in that order and illuminate an object. Reflected light from the object passes through the polarizing beam splitter and imaging optical element in that order and is imaged at the photodetector. The pulse emitter is disposed at a focal position on one side of the collimation lens, and the photodetector is disposed at a focal position on one side of the imaging optical element.

According to an aspect of the disclosure, there is provided a flight time measurement device including at least a pulse emitter, a collimation lens, an imaging optical element, and the photodetector. The pulse emitter causes pulse light to pass through the collimation lens and illuminate an object. Reflected light from the object passes through the imaging optical element and is imaged at the photodetector. The pulse emitter is disposed at a focal position on one side of the collimation lens, and the photodetector is disposed at a focal position on one side of the imaging optical element.

According to an aspect of the disclosure, there is provided an optical radar device including the flight time measurement device.

BRIEF DESCRIPTION OF THE DRAWINGS

FIG. 11 is a diagram illustrating light reception intensity distribution at the photodetector of the flight time measurement device;

FIG. 19 is a diagram illustrating light reception intensity distribution at the photodetector of the flight time measurement device of the optical radar;

FIG. 22A is a frontal view illustrating the configuration of a pulse-emission element in the optical radar device;

FIG. 22B is a plan view illustrating the configuration of the pulse-emission element in the optical radar device;

FIG. 28 is a schematic diagram illustrating a light-detection region of a photodetector in an optical radar device according to a seventh embodiment of the present disclosure.

DESCRIPTION OF THE EMBODIMENTS

First Embodiment

Figure 1:
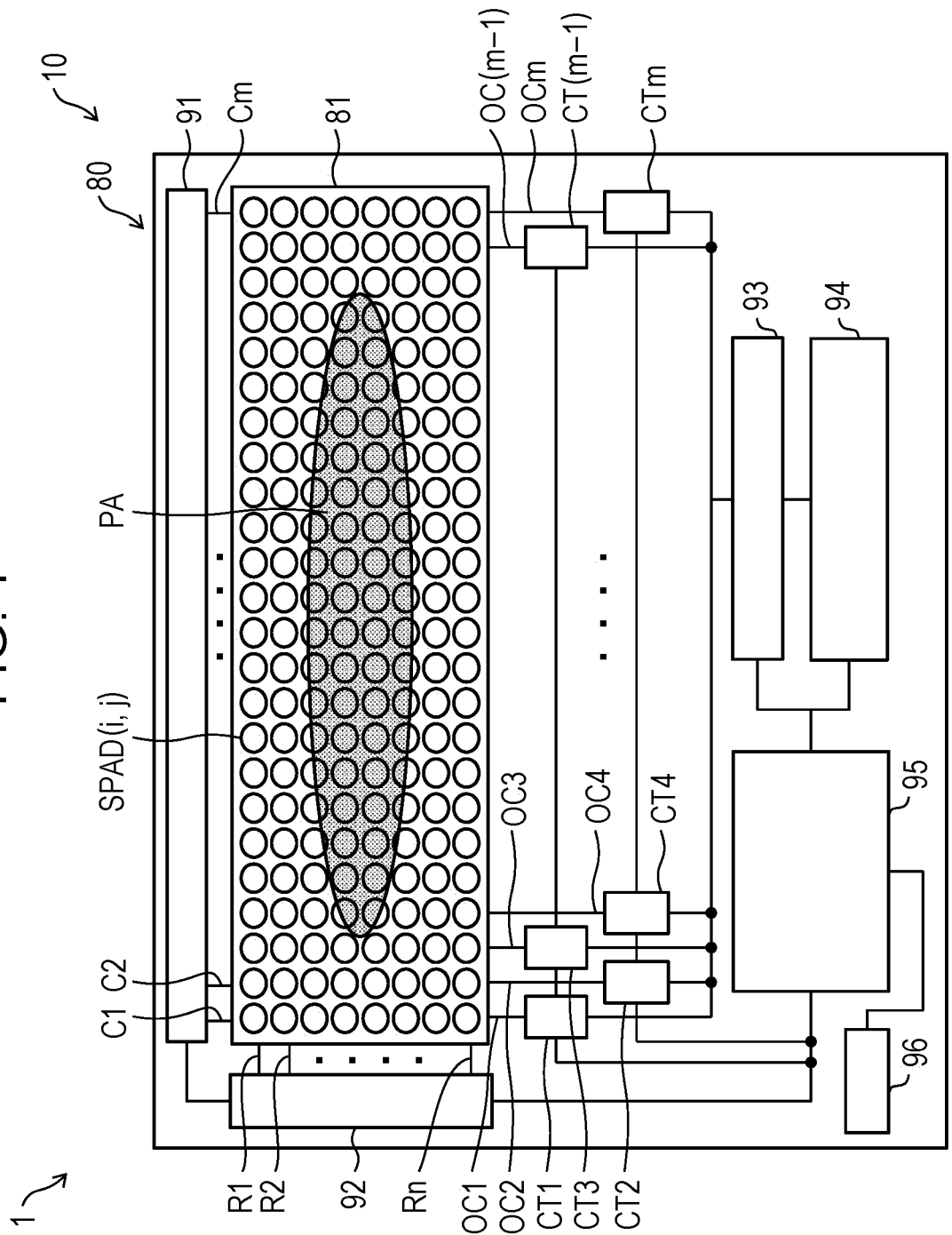
FIG. 1 is a schematic diagram illustrating the configuration of a photodetector provided in a flight time measurement device of an optical radar device according to a first embodiment of the present disclosure.
Figure 2:
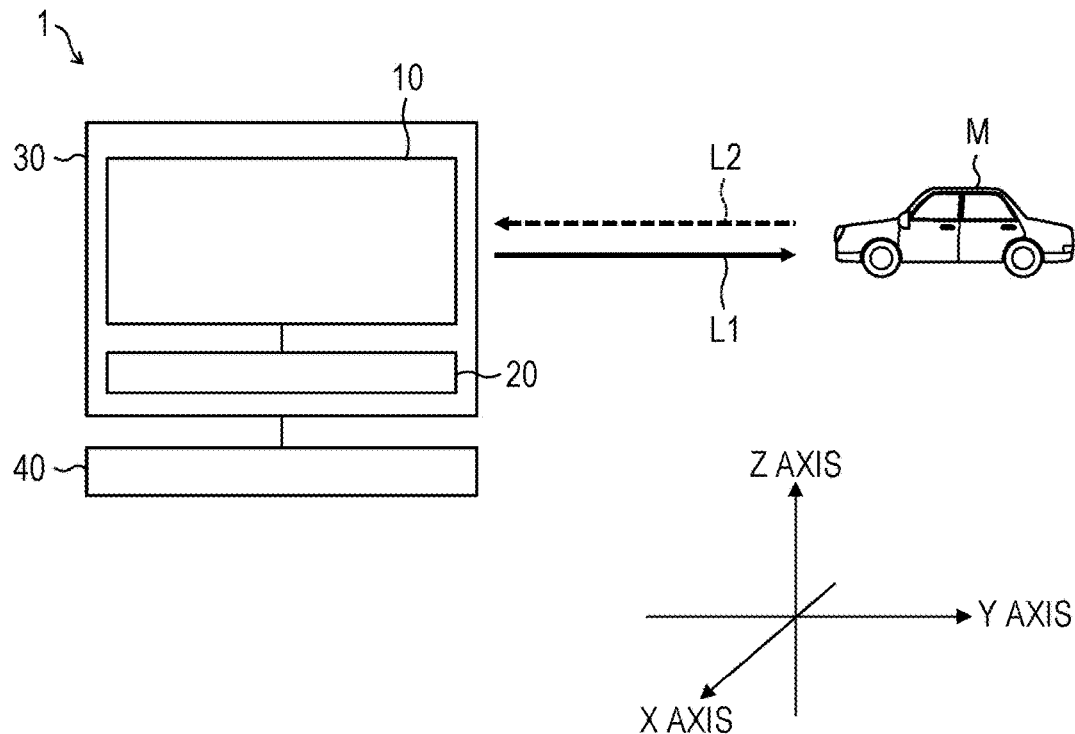
FIG. 2 is a schematic diagram illustrating the overall configuration of the optical radar device.

An embodiment of the present disclosure will be described with reference to FIGS. 1 through 13. The configuration of an optical radar device 1 having a flight time measurement device 10 according a first embodiment of the present disclosure will be described with reference to FIG. 2. FIG. 2 is a schematic diagram illustrating the configuration of the optical radar device 1 according to the present embodiment.

As illustrated in FIG. 2, the optical radar device 1 includes the flight time measurement device 10 that illuminates an object M by pulse light L1 and receives reflected light L2 from the object M, a control-and-power-source unit 20 that supplies electric power to the flight time measurement device 10 and controls the timing of emitting pulse light and of receiving light, and a housing 30 that accommodates the flight time measurement device 10 and control-and-powersource unit 20. The optical radar device 1 also has a driving-and-interfacing unit 40 that rotates the housing 30, supplies electric power to the control-and-power-source unit 20, transmit synchronization signals relating to rotation, and externally outputs measurement results from the control-and-power-source unit 20.

The coordinate axes illustrated in FIG. 2 indicate, in general usage, the vertical direction for the Z axis, the pulse light emission direction for the Y axis, which is the measurement object direction, and the X-Y plane is a horizontal plane. The optical radar device 1 is a device that scans the pulse light L1 in the horizontal direction by rotating the flight time measurement device 10. The rotational angle may be 360 degrees, or may be a certain range such as 120 degrees or 210 degrees.

Figure 3:
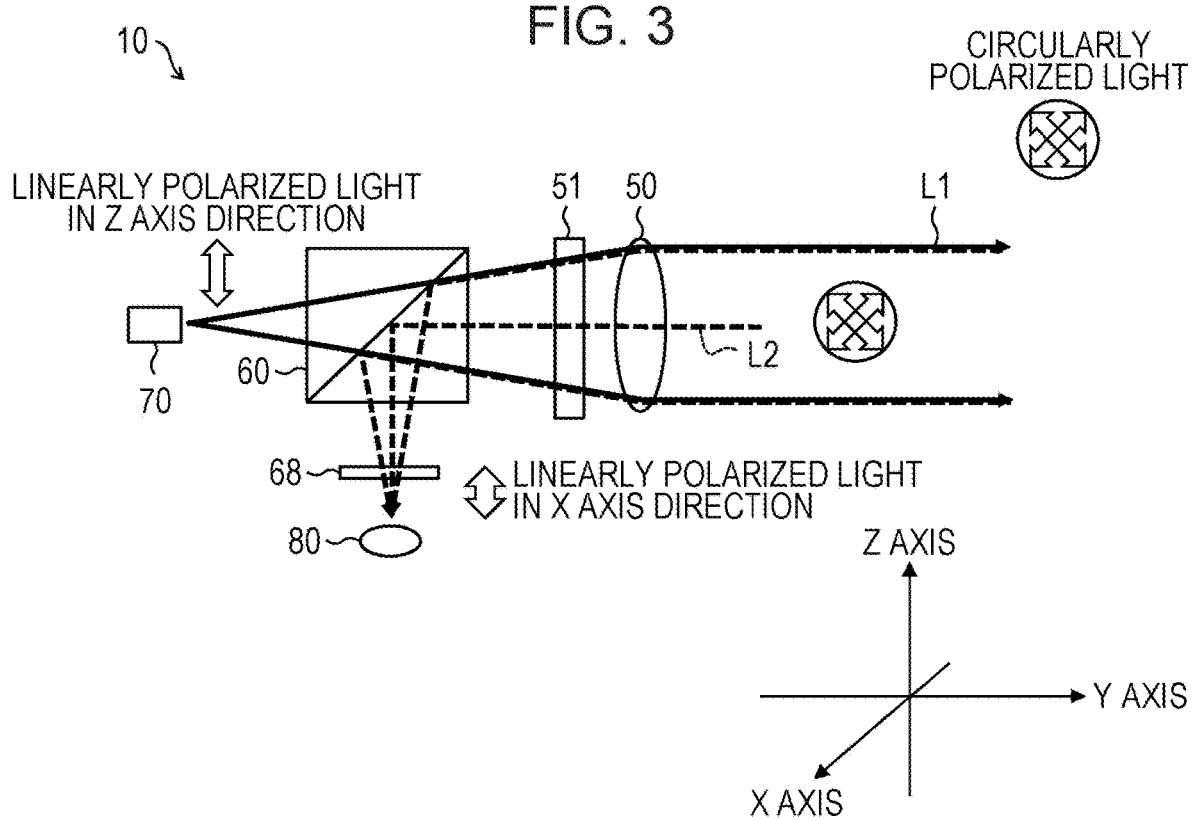
FIG. 3 is a schematic diagram illustrating the configuration of the flight time measurement device making up the optical radar device.

Next, the configuration of the flight time measurement device 10 provided to the optical radar device 1 will be described with reference to FIG. 3. FIG. 3 is a schematic diagram illustrating the configuration of the light time measurement device 10 in the optical radar device 1. The flight time measurement device 10 has a lens 50, a quarter wavelength plate 51, a polarizing beam splitter 60, a pulse emitter 70, a photodetector 80, and an optical band-pass filter 68.

The lens 50 is an imaging optical element. A light-emitting portion of the pulse emitter 70 and a light detection portion of the photodetector 80 are disposed at one focal position of the lens 50. The lens 50 acts as a collimator lens regarding the pulse light L1, and on the other hand acts as an imaging optical element to collect the reflected light L2 to the photodetector 80 regarding the reflected light L2. The pulse emitter 70 is an element that emits pulse light L1 that has been linearly polarized in the Z axis direction. The polarizing beam splitter 60 is a cube type arrangement having a boundary plane parallel to the X axis and inclined 45 degrees to the Z axis, and transmits light that has been linearly polarized in the Z axis direction, emitted from the pulse emitter 70. The quarter wavelength plate 51 changes the light that has been linearly polarized in the Z axis direction into circularly-polarized light. Accordingly, the pulse light L1 is emitted from the lens 50 toward the object M as approximately parallel light that has been circularly polarized. The reflected light L2 from the object M is collected at the lens 50, and components linearly polarized in the X direction by the polarizing beam splitter 60 are collected to the photodetector 80. In a case where the reflected light L2 is circularly polarized like the pulse light L1, this is changed into light linearly polarized in the X direction by the quarter wavelength plate 51, so there is little reflection loss at the polarizing beam splitter 60. Although the lens 50 is described as being used as the imaging optical element in this configuration, this arrangement is not restrictive. A similar configuration can be made using a reflecting mirror such as an off axis reflecting mirror as an imaging optical element, as well.

The flight time measurement device 10 may have a hood such as a transparent cover or the like on the outer side of the lens 50, to avoid adhesion of obstructions such as raindrops, mud, foreign matter, or the like. The hood may have a filtering function to cut out light such as visible light that does not contribute to ranging. Other optical elements besides such a cover serving as a window to protect the imaging optical element, such as reflecting mirrors or the like, are preferably not included. The reason is to avoid reduction in light quantity due to reflection and change in polarization state. It should be noted that configurations using scanning mirrors are described later in first and second modifications, but these are parts used for scanning without using a rotating mechanism, and are exceptional instances. The decrease in light quantity at scanning mirrors can be minimized by using high-precision articles with high reflectivity.

In a case of using an edge emitting laser chip as the pulse emitter 70, the emitting layer is set parallel to the Z axis, and the emission axis in the Y axis direction. An edge emitting laser chip linearly polarizes parallel to the emitting layer, so this placement enables linear polarization in the Z axis direction. Light emitted from an edge emitting laser chip has more divergence in the X direction as compared to divergence in the Z axis direction at near-field. In a case of a VCSEL (Vertical Cavity Surface Emitting LASER) chip as the pulse emitter 70, with the VCSEL chip with linear polarization being set so that the polarization direction is parallel to the Z axis.

The optical band-pass filter 68 preferably is disposed in front of the photodetector 80, as illustrated in FIG. 2. This is because adding the optical band-pass filter 68 that has a wavelength transmission bandwidth of several nm to several tens of nm with the wavelength of the pulse light L1 as the central wavelength of the transmission band enables components of the reflected light L2 generated by background light that is different form the pulse light L1 to be reduced, and the S/N ratio can be improved.

According to the configuration of the flight time measurement device 10 illustrated in FIG. 3, a configuration can be made where the lens 50 is used for both emission and reception, and using the polarizing beam splitter 60 enables the pulse light L1 and reflected light L2 to both pass over the same optical path. With regard to light emission, linearly-polarized light from the pulse emitter 70 can be emitted with almost no change, so loss of light is small. With regard to reflected light, there is little loss in a case where the reflected light L2 from the object M is circularly polarized the same as the pulse light L1. Using the lens 50 in common enables reduction of a large lens, and cost can be reduced. Further, the polarizing beam splitter 60 is set behind the lens 50 (opposite to the direction of the object M), so a polarizing beam splitter that is smaller in size than the diameter of the lens 50 can be used. As a result, costs can be reduced.

Note that the quarter wavelength plate 51 does not necessarily have to be used. In a case where the quarter wavelength plate 51 is not provided, the pulse light L1 is linearly polarized, and the received reflected light L2 has linearly-polarized light different from the pulse light L1. Accordingly, although reception intensity depends on the reflection properties of the object M, the advantages according to an aspect of the present disclosure are the same.

Pulse Emitter

The pulse emitter 70 is an element that emits light at a pulse width where the half bandwidth is around 1 nsec to several hundred nsec. The peak power of the pulses is from several W to several hundred W. Although the emission wavelength may be decided depending on the usage, infrared rays having a wavelength of around 700 nm to 1600 nm is preferable. This is good in that the rays are not visible to the human eye and accordingly are not bothersome, and further the longer the wavelength is, the greater the safety is regarding animal eyes. Also, the longer the emitted wavelength is, the lower the background light intensity is, and particularly background light is low in intensity at wavelengths around 940 nm to 950 nm due to sunlight having been absorbed by moisture in the atmosphere, so this wavelength is preferable. Using an emission wavelength of 1000 nm or below is good in that inexpensive silicon elements can be used as light detection portions. The shorter the wavelength is the higher the quantum efficiency is with silicon elements, so taking the above-described factors into consideration, around 900 nm to 950 nm is most preferable.

The cross-sectional shape of the pulse light L1 at a distance is decided by the shape of the light-emission region, which is the size of the region actually emitting laser light. Accordingly, the shape with an edge emitting laser chip will be close to an ellipse with major axis in the direction parallel to the emission layer and minor axis in a perpendicular direction. On the other hand, with VCSEL chip, the cross-sectional shape of the pulse light L1 at a distance is decided by the layout of multiple laser emitting units, and various shapes can be made, such as circles, polygons, rectangles, and so forth.

Light emitted by the pulse emitter 70 has to reach a far distance without losing intensity, and divergence of the light has to be maximally reduced. The larger the size of the emitting region of the pulse emitter 70 is, the more the divergence of the pulse light L1 at a distance increases, so the emitting region preferably is small. The size of the emitting region means a largest diameter P of the emitting region at near-field.

The emitting region of an edge emitting laser chip is long in the direction parallel to the emission layer, and is short in the perpendicular direction. As a result, the largest diameter P is the length in the direction to the emission layer, and normally is generally equal to the ridge width. The aspect ratio P/U of the light-emission region is P/U≫1, where U represents the size of the light-emission region in the perpendicular direction as to the emission layer.

VCSEL chips often include multiple laser emitting nits in the light-emission region, so the largest diameter of all of the multiple laser emission units is the size P of the Light-emission region, not the size of the aperture that indicates the size of the light emitting portion of each laser emitting unit. Normally, P/U is around 1 for VCSEL chips.

The pulse emitter 70 preferably includes, along with an emitting laser chip, a driving circuit to drive the chip. The power source for emission is supplied by the control-and-power-source unit 20, and charging operations prior to emission and timing for emission operations are also controlled by the control-and-power-source unit 20.

Lens

The lens 50 preferably has a long focal length f in order to measure to a distance. A long focal length f enables divergence of pulse light L1 to be reduced, and illumination intensity at a distance to be raised. Also, a long focal length f increases the aperture of the pulse light L1 near the lens 50, so light intensity per unit area is reduced, making it easier to satisfy the conditions for Class 1, which is a safety standard for laser devices. As a result, raising the peak power of the pulse light enables ranging farther away.

The lens 50 further preferably has a large optical aperture. A large optical aperture of the lens 50 means that the light collecting capabilities of the lens 50 are high, and reflected light L2 from a distance can be effectively collected. Note that in FIG. 2, only the quarter wavelength plate 51 is situated between the lens 50 and the polarizing beam splitter 60, so the length of the flight time measurement device 10 in the Y axis direction is long in accordance with the length of the focal length f in this configuration. However, a mirror may be disposed between the lens 50 and the polarizing beam splitter 60 to reduce the Y axis direction length of the flight time measurement device 10 by bending the optical path between the lens 50 and polarizing beam splitter 60.

In this configuration, the lens 50 is used as a collimator lens for the pulse light L1 that is emitted light, and on the other hand the lens 50 is used as an imaging optical element to collect the reflected light L2 to the photodetector.

The following relations generally hold, where P represents the size of the light emitting portion of the pulse emitter 70, θ represents FWHM (Full Width at Half Maximum) of angular distribution of light emitted from the light emitting portion, and Q represents the size of the light detection portion, which is the length of the detection portion in the same direction as the size P of the light emitting portion.

Diameter of pulse light L1 near lens 50:

$\phi(0)=2 \cdot f \cdot \sin(\theta/2)$ (i.e., 1.3 cm)

Diameter of illumination region IA of pulse light L1 on object M, at distance L away from lens 50:

$\phi(L)=P \cdot L/f+\phi(0)$ (i.e., 28.0 cm)

Diameter of projection portion PA where illumination region IA is projected on light detection portion by lens 50:

$I\phi(L)=\phi(L)/L \cdot f=P+2f\cdot 2\cdot\sin(\theta/2)/L$ (i.e., 0.21 mm)

where the numerical values in parentheses are values in a case where the FWHM θ is 10 degrees, focal length f=75 mm, light-emission region size P=0.2 mm, and distance L=100 m. At a distance, the second term of Iϕ(L) is negligible, so Iϕ(L)≈P.

Now, the relation between the projection portion of the light illumination region and the light-detection region will be described with reference to FIGS. 4A through 4D. FIGS. 4A through 4D are schematic diagrams illustrating the relation between the projection portion of the light illumination region and the light-detection region in the flight time measurement device 10.

Figure 4A:
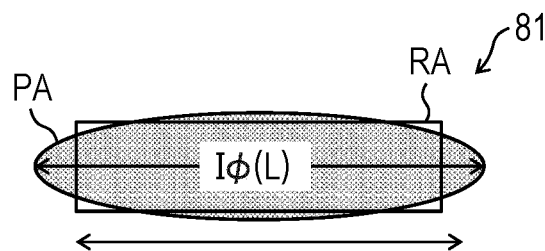
FIGS. 4A through 4D are schematic diagrams illustrating the relation between a projection portion of a light illumination region and light-detection region in the flight time measurement device making up the optical radar device.
Figure 4B:
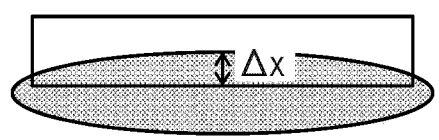
Figure 4C:
Figure 4D:
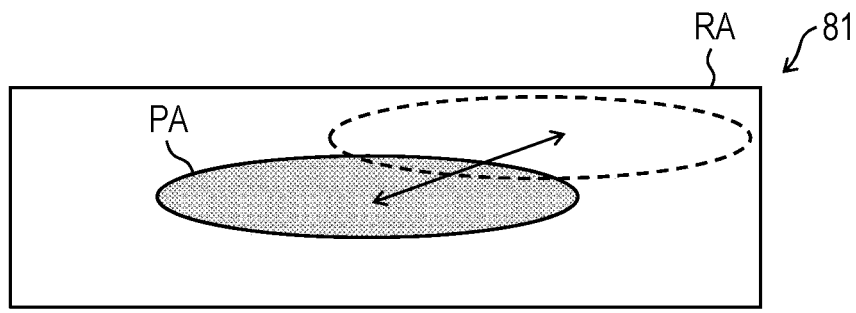

In order to increase the detection signal intensity of the reflected light L2, an actual light-detection region RA of the photodetector 80 has to be overlaid on a projection region PA, as illustrated in FIG. 4A. However, as illustrated in FIG. 4A, in a case where the size of the light-detection region RA and the size P of the light-emission region are approximately equal, and the center of the pulse emitter 70 or the center of the photodetector 80 deviate away from each other away from the optical axis of the lens 50 in their placement, deviation between the light-detection region RA and projection region PA occurs, as illustrated in FIGS. 4B and 45. As a result, the reflected light of the pulse light L1 decreases as to reflected light of background light, the S/N ratio falls, and the maximum ranging distance becomes shorter. Increase the light-detection region RA as to the projection region PA as illustrated in FIG. 4D enables light to be received even if there is some deviation between the optical axes of the receiving system and the emitting system. However, increasing the light-detection region RA results in including an object M where the pulse light L1 is not emitted in the light-detection region RA, so unnecessary background light is received, the S/N ratio falls, and the maximum ranging distance is not increased. Measures to deal with this issue will be described later in a section regarding the photodetector 80.

Polarizing Beam Splitter

The polarizing beam splitter 60 in the present embodiment is described as being a cube-type arrangement where two right-angle prisms are applied to each other, and a multiple-layer dielectric film is formed at the plane of junction. However, the polarizing beam splitter 60 is not restricted to being a cube type, and may be a plate type. In a case of a cube type, a normal polarizing beam splitter where the plane of junction transmits P-polarized light (polarized light in the Z axis direction in FIG. 3) of incident light, and reflects S-polarized light (polarized light in the X axis direction in FIG. 3). The polarizing beam splitter 60 is preferably installed as far away from the lens 50 as possible. The reason is that the farther away from the lens 50, the smaller the size of the polarizing beam splitter 60 can be made to be.

Photodetector

The configuration of the photodetector 80 according to the present embodiment will be described with reference to FIG. 1. FIG. 1 is a schematic diagram illustrating the configuration of the photodetector 80 in the optical radar device 1. The photodetector 80 includes a light detection portion 81, a column selecting circuit 91, a row selecting circuit 92, a summation circuit 93, a ToF measuring unit 94, a control circuit 95, and memory 96, as illustrated in FIG. 1.

The light detection portion 81 may be made up of single photon avalanche diodes (SPAD) (i, j), that are photon detection elements arrayed in an array of n rows and m columns. The light detection portion 81 is configured to be larger than the projection region PA of the illumination region IA on the photodetector 80 by the lens 50, and is configured such that the projection region PA remains within the light detection portion 81 even in a case where the set positions of the pulse emitter 70 and photodetector 80 deviate in different directions from each other. By only activating SPADs (i, j) overlaying the projection region PA, the projection region PA can be covered by the minimum number of SPADs (i, j) even if there is positional deviation. Accordingly, unnecessary background light is not received, the S/N ratio can be maintained high, and reduction of the maximum ranging distance can be avoided.

In the present embodiment, a large-scale array can be easily manufactured by using SPADs (i, j) formed on a silicon substrate, so there is no large increase of costs. For example, the light-emission region of an edge emitting laser chip is around 200 μm×10 μm, which is around the size of the projection region PA in the configuration in FIG. 3. Even if positional deviation occurs by ±100 μm in both the vertical direction and horizontal direction, the size of the light detection portion 81 is around 400 μm×210 μm. This is sufficiently smaller than several millimeters, which is a normal size of a silicon large scale integration (LSI) circuit. As described above, it is preferable that the light detection portion 81 is larger than the projection region PA to an extent of maximum deviation between centers of the projection region PA and the light detection portion. 81 appeared in manufacturing. The maximum deviation is usually less than 500 μm and preferably less than 200 μm.

There are cases where flight time measurement has to be performed by a single pulse of pulse light L1, in scan-type flight time measurement such as in the present embodiment. In such cases, addition of measurement results relating to a great number of pulses of pulse light L1 is not an option. Accordingly, the intensity of the pulse light L1 at the illumination region IA is sufficiently stronger than the background light, and the number of photons detected by the photodetector 80 is great. In such a situation, it is preferable to install a great number of small SPADs, than to install a small number of large SPADs. The reason is that after receiving light one time, one SPAD is not available to receive other light during dead time (10 nsec to 100 nsec). The average number of photons that one SPAD receives during dead time preferably is smaller than one. Accordingly, laying out a great number of SPADs in an array as illustrated in FIG. 1 is suitable for such a scanning-type flight time measurement device 10.

The shape of the light detection portion 81 can be freely changed in accordance with the shape of the projection region. PA and the allowable positional deviation amount. For example, in a case of an edge emitting laser, the light-emission region is elliptic and the shape of the projection region. PA also is elliptic, so a rectangular shape such as illustrated in FIGS. 4A through 4D, or an ellipse is preferable. With VSEL where the light-emission region is close to a circle, the projection region PA also is close to a circle, so a square or circle is preferable. In the case where the probability of position deviation in the vertical direction is greater than in the horizontal direction in FIGS. 4A through 4D, the length in the vertical direction can be extended.

The number of SPADs (i, j) overlaying the projection region. PA is preferably as many as possible. At least 50 or more is preferable, and 100 or more is even more preferable.

The photodetector 80 has the column selecting circuit 91 and row selecting circuit 92 as circuits to select and activate rows and columns overlaying the projection region PA, out of the SPADs (i, j) within the light detection portion 81. The SPADs (i, j) are connected to the column selecting circuit 91 by column selection lines Cj, and connected to the row selecting circuit 92 by row selection lines Ri. In the light detection portion 81, only the SPADs (i, j) connected to activated column selection lines Cj and row selection lines Ri are activated and detect incident photons. However, the other SPADs (i, j) do not detect, and dot not contribute to measurement. Thus, detection of unwanted background light can be avoided.

The SPADs (i, j) may be connected to column counters CTj by column signal lines OCj. The column counters CTj may be binary counters that add the number of pulses occurring when photons are detected by the connected. SPADs (i, j), and output a sum of photons detected by j rows of SPADs during a measurement period as accumulated value Nj. Column counters CT1 through CTm are connected to the summation circuit 93, and the output of the summation circuit 93 is connected to the ToF measuring unit 94. When a measurement period ends, outputs of the column counters CTj of each column are read out to the summation circuit 93. The summation circuit 93 calculates the summation of the column counters CTj, which is $\Sigma Nj=N1+N2+\ldots+Nm$, and outputs the results to the ToF measuring unit 94. The column counters CT1 through CTm and the summation circuit 93 are reset each time this read is performed.

The above operations are repeated each certain time $\Delta T$ from emission of the pulse light L1, and the $\Sigma Nj$ of each time zone is accumulated in the ToF measuring unit 94 in time sequence. With the l'th $\Sigma Nj$ (here l is an integer from 0 to 1 m) as N(1), N(1) is the number of photons that the light detection portion 81 has detected during the certain time $\Delta T$, from elapsed time $T=\Delta T \cdot 1$, from pulse emission. $Tm=\Delta T \cdot 1$ m is the maximum flight time, and $Tm \cdot c/2$ (where c represents the speed of light) is the maximum measurable distance. The ToF measuring unit 94 calculates flight time from the recorded N(1). The calculation method will be described later.

Although a column counter CTj is provided for each column in the present embodiment, a binary counter may be provided for each of multiple columns. However, in a case where the output of multiple columns is to be counted by one binary counter, there is an increase possibility of count loss occurring, so a configuration is to be made where count loss is minimized in accordance with the amount of counting for each column.

Also, every certain time ΔT, the column counters CTj sweep the count results to the summation circuit 93, reset, and proceed with the next counting. Accordingly, there are cases where a time zone occurs in which counting is interrupted. This counting interruption time is preferably as short as possible. Accordingly, an arrangement can be conceived where the column counters CTj are provided with buffers to store count results, for example. Accordingly, even if the counter portion is reset, the contents of the buffer is kept. Accordingly, by making a configuration where the summation circuit 93 reads out the counting results from these buffers and synchronize the contents of the counters with the contents of the buffers after readout ends, the time for counter resetting operations is the interruption time.

Alternatively, the interruption time can be made to be substantially zero by providing two systems of counters, and switching and using these every ΔT. Note that there is no need for a circuit configuration where the number of detected photons of activated SPADs (i, j) every certain time to be restricted to a configuration such as illustrated in FIG. 1 where counting is performed by binary counters at each column and the sum of all binary counters is obtained. Any configuration may be used, as long as a circuit configuration where the sum of the number of detected photons at the activated. SPADs (i, j) can be obtained in time sequence.

The photodetector 80 includes the control circuit 95 that executes various functions of the photodetector 80 as described above, and controls the timing thereof. The control circuit 95 may include a central processing circuit (CPU) unit, and memory 96 such as random access memory, non-volatile memory, or the like.

Figure 5:
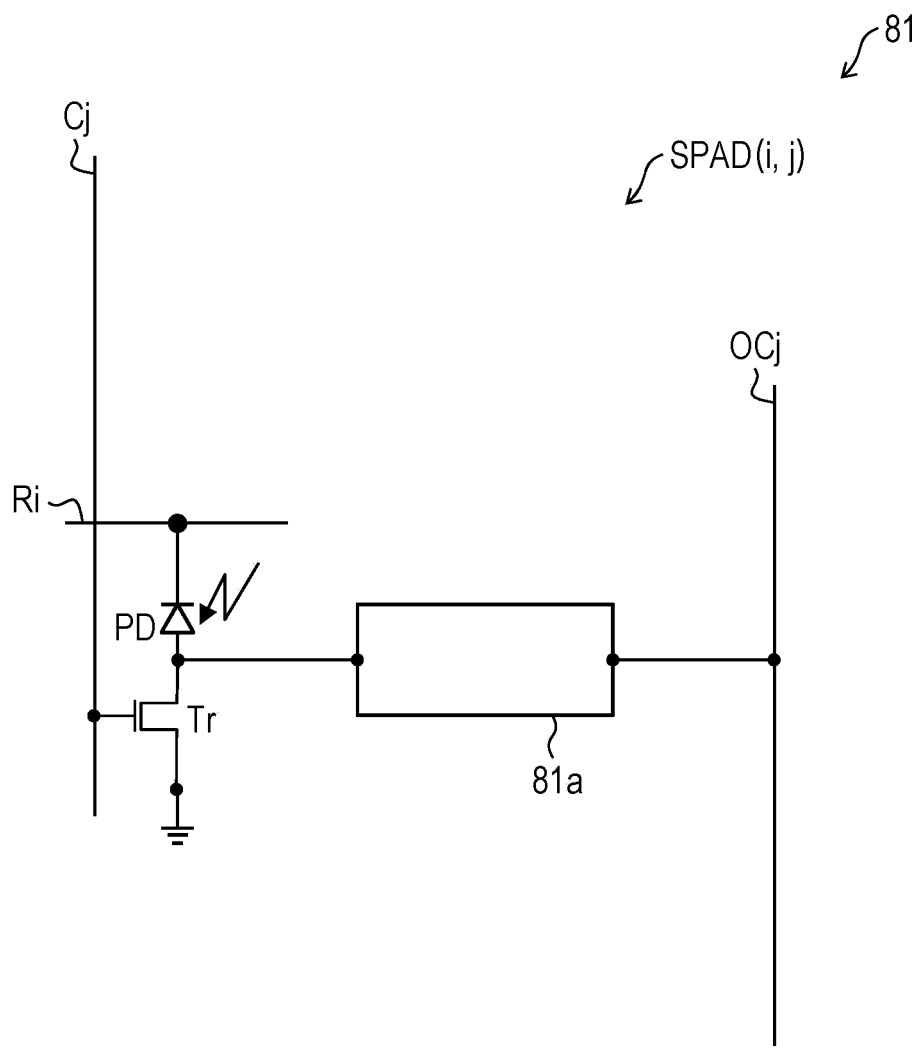
FIG. 5 is a schematic diagram illustrating a specific configuration of a single photon avalanche diode (SPAD) making up a light detection portion of the photodetector.
Figure 6:
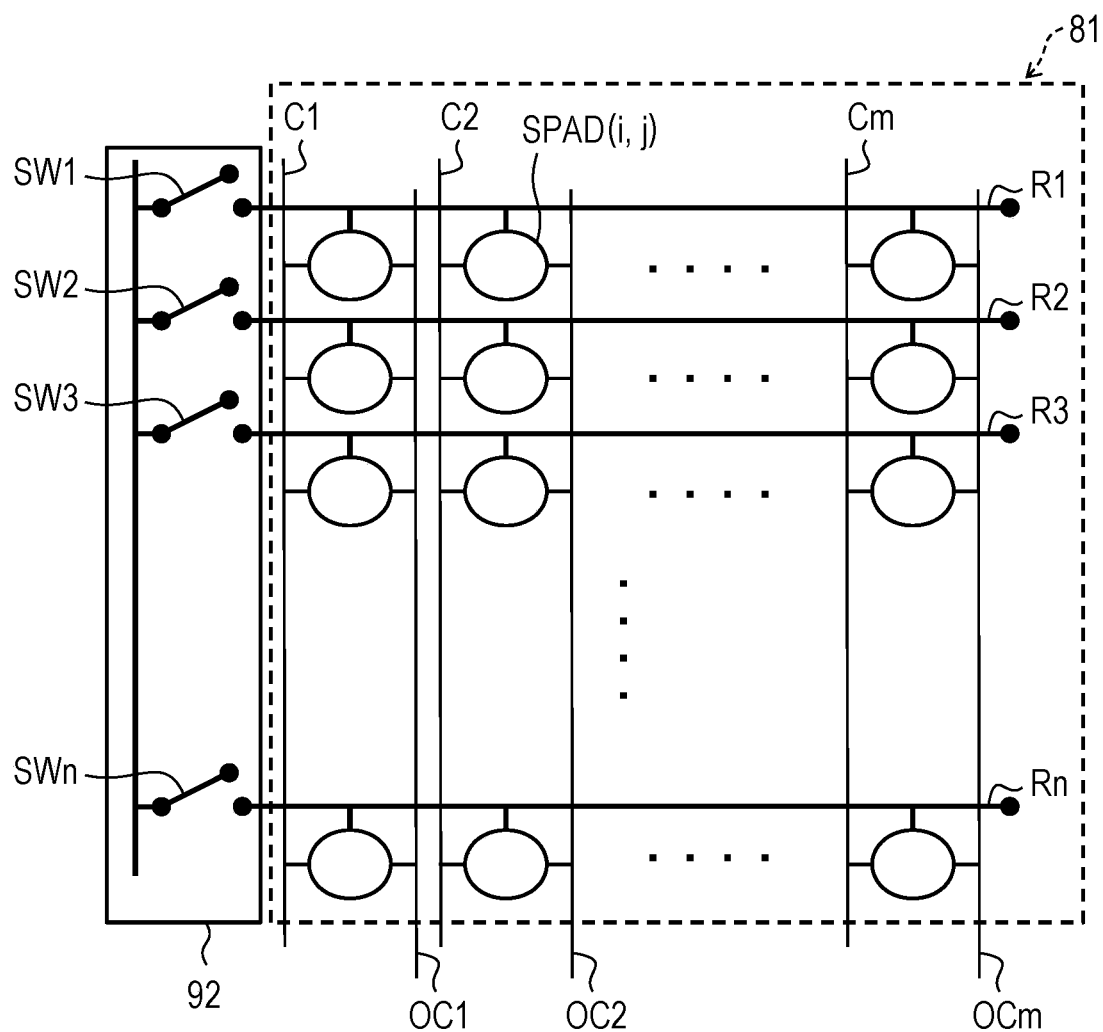
FIG. 6 is a schematic diagram illustrating the configuration of a SPAD array making up the light detection portion.

Next, a specific configuration of the SPADs making up the light detection portion 81 will be described with reference to FIGS. 5 and 6. FIG. 5 is a schematic diagram illustrating a specific configuration of a SPAD making up the light detection portion 81. FIG. 6 is a schematic diagram of the configuration of a SPAD array making up the light detection portion 81.

As illustrated in FIG. 5, the SPADs (i, j) that are elements of a SPAD array include a photodiode PD, a transistor Tr, and a pulse output circuit 81a. The photodiode PD is supplied with electric power from a row selection line Ri. A column selection line Cj is connected to the gate electrode of the transistor Tr, and only SPADs (i, j) where the row selection line Ri connects to the power source and the column selection line Cj is activated goes into photon detection mode. Passive quenching is used in the SPADs (i, j) according to the present embodiment, with the on resistance of the transistor Tr acting as a quenching resistor. A different circuit configuration is used in a case of active quenching.

The pulse output circuit 81a is a circuit that, in a case of the photodiode PD having detected a photon, outputs a pulse of a certain duration to the column signal line OCj. Although FIG. 5 shows the transistor Tr being on the ground (GND) side of the photodiode PD, the transistor Tr may be disposed between the photodiode PD and high-voltage power source. Further, the transistor Tr is not restricted to an N-type metal-oxide semiconductor (NMOS), and may be a P-type metal-oxide semiconductor (PMOS).

The row selecting circuit 92 includes switches SW1 through SWn that connect power source VSPAD for the SPADs to each of the row selection lines Ri, and circuits controlling the switches SWi, as illustrated in FIG. 6. The row selecting circuit 92 can turn the switches SWi on in any combination. The column selecting circuit 91 also includes switches to activate any of the column selection lines Cj and control circuits thereof, although this is omitted from illustration. In the circuit of the SPAD (i, j) illustrated in FIG. 5, the transistor Tr is configured of an NMOS field-effect transistor (FET), so the SPAD (i, j) is activated when the column selection lines Cj is set to H level.

Figure 7:
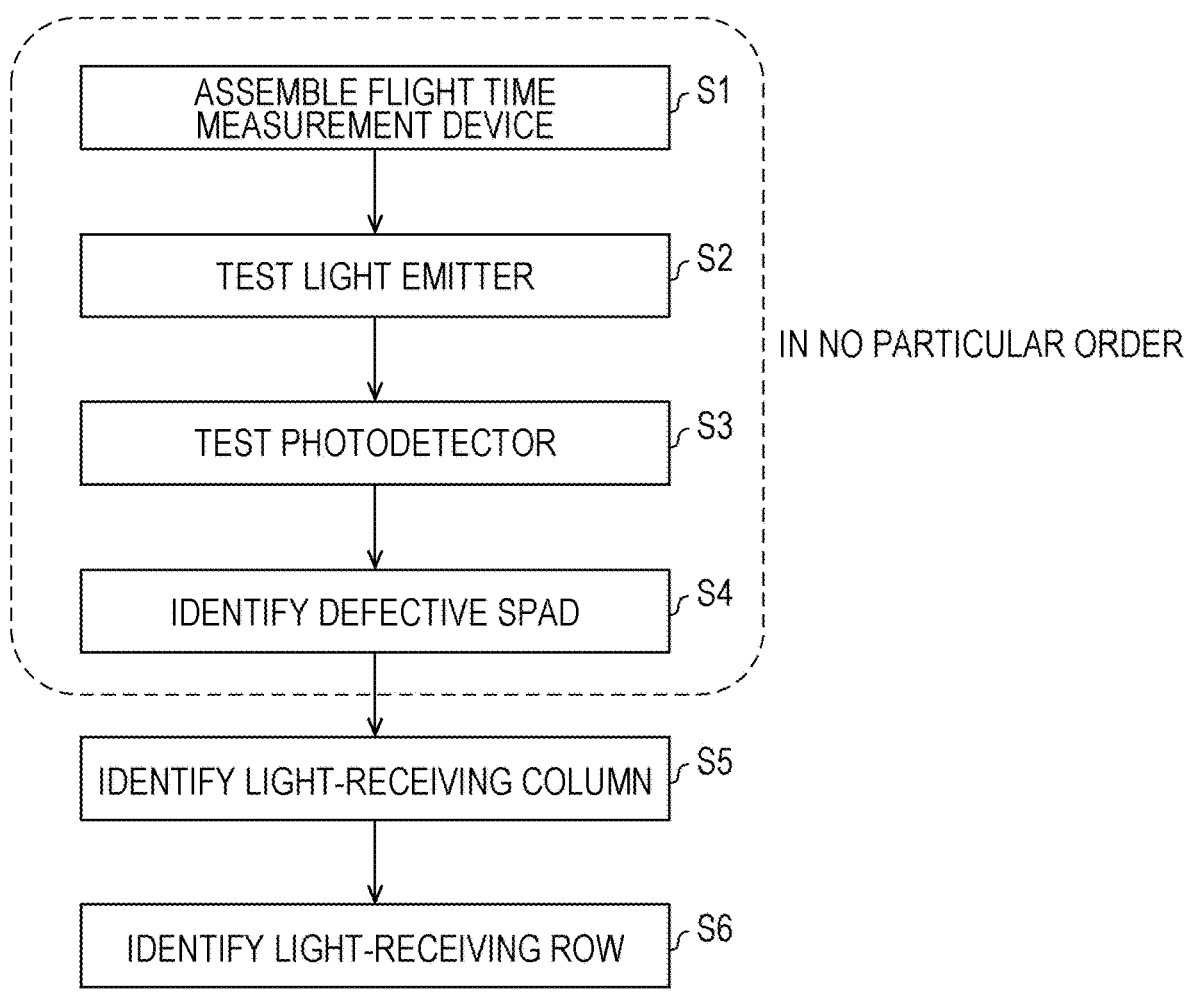
FIG. 7 is a flowchart illustrating a main setup flow for the photodetector.
Figure 8:
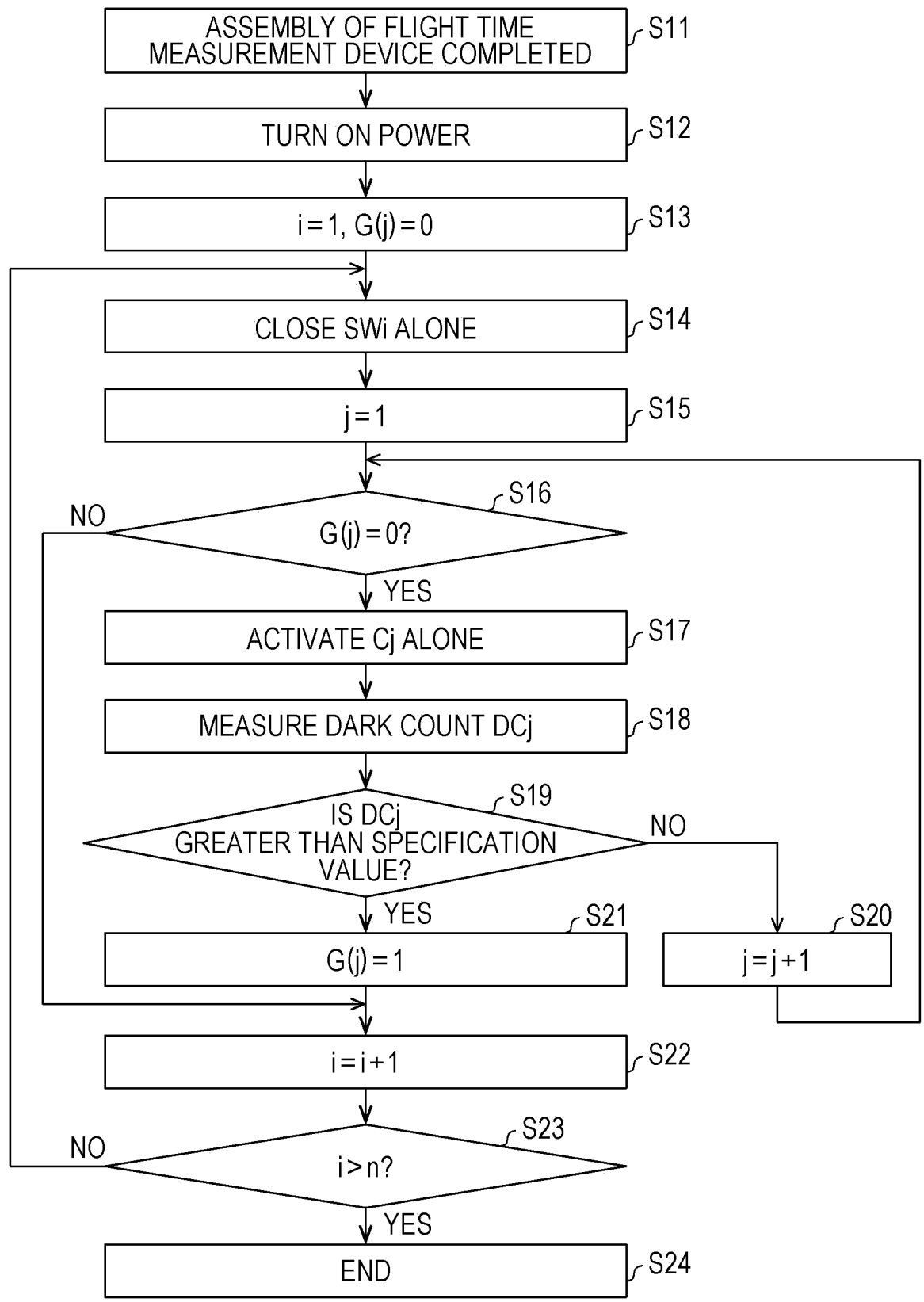
FIG. 8 is a flowchart illustrating a detailed flow for the photodetector, showing a defective SPAD exclusion process for the photodetector.
Figure 9:
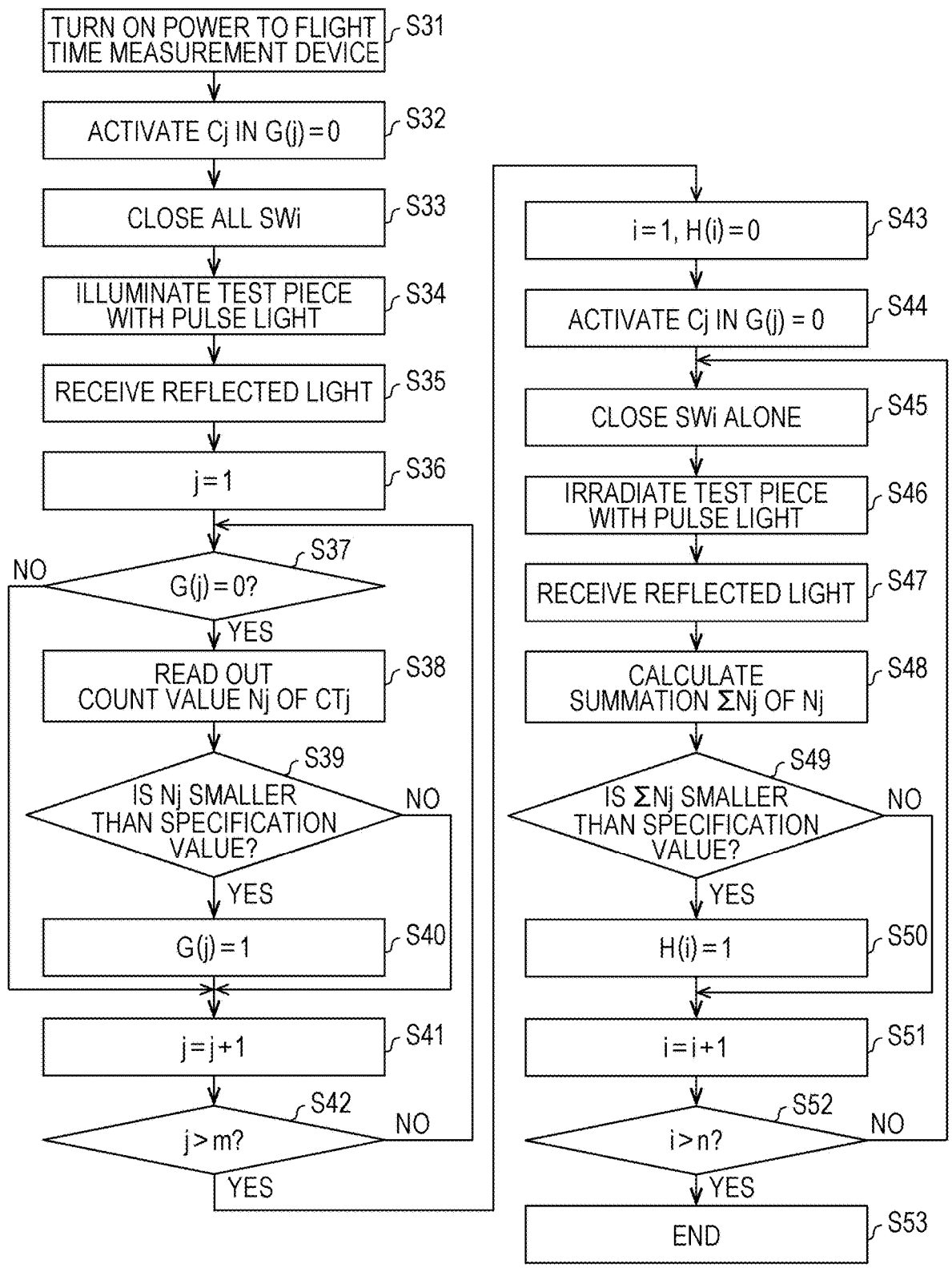
FIG. 9 is a flowchart illustrating a detailed flow for the photodetector, showing a process for columns and rows to be activated in the photodetector.

Selection of SPADs (i, j) to activate is performed based on the flow illustrated in FIGS. 7 through 9. FIG. 7 is a flowchart illustrating a main setup flow for the photodetector 80, and FIGS. 8 and 9 are flowcharts illustrating detailed flows for the photodetector 80.

Once the flight time measurement device 10 is assembled (S1), light-emission testing of the pulse emitter 70 (S2), testing of the photodetector 80 (S3), and identifying of defecting SPADs (S4) are performed, as illustrated in FIG. 7. Note that the processes in S1 through S4 are in no particular order. In the light-emission testing of the pulse emitter 70 in S2, whether or not the pulse emitter 70 emits pulse light L1 according to specification is tested. In the testing of the photodetector 80 in S3, testing is performed regarding whether circuits other than SPADs operate normally, regardless of detection properties of individual SPADs. That is to say, in addition to the properties of the pulse emitter 70 being suitable, such as the pulse width, central wavelength, wavelength distribution, emission power and so forth, of the pulse light L1 being evaluated, evaluation is also made regarding the suitableness of the emission direction, light intensity distribution within a plane perpendicular to the emission direction, and so forth, of the pulse light L1 after having passed through the polarizing beam splitter 60, quarter wavelength plate 51, and lens 50.

In the identifying of defective SPADs in S4, primarily SPAD properties when dark are evaluated. Details are as illustrated in FIG. 8. FIG. 8 is a flowchart illustrating a defective SPAD exclusion process for the photodetector 80.

Upon assembly of the flight time measurement device 10 being completed (S11), power is turned on (S12). Next, i representing a selected row, is set to 1 and all G(j) are set to 0 as initial settings (S13). G(1) through G(m) are 1-bit memory, where G(j)=0 means that column j is usable, while G(j)=1 means that column j is unusable. Subsequently, the row selecting circuit 92 turns switch SWi on (closed) (S14).

Next, S15 through S19 illustrate a loop for sequentially testing selected column No. 1 through selected column No. m. Specifically, selected column No. 1 is selected first (S15). Of G(j)=0 (S16), the column selection line Cj is activated by the column selecting circuit 91 (S17). This activates the SPAD (i, j), pulse output when dark is accumulated at the column counter CTj (S18), and determination is made regarding whether a cumulative count DCj is greater than a specification value or not (S19). In a case where the cumulative count DCj is greater than specification value, the SPAD (i, j) is not usable, so G(j)=1 is set (S21). On the other hand, if not greater, there is no problem, so the selected column No. j is incremented by 1 (S20) and the flow returns to S16.

Upon all selected column Nos. being tested for the selected row No. i in the loop from S15 through S21, the selected row No. i is incremented by 1 (S22), and the flow returns to S14 to transition to the next selected row No. When the selected row No. i exceeds n (S23), the test ends (S24).

In the present configuration, settings are made such that in a case where there is even one SPAD (i, j) with a largest dark count, the entire selected column No. j is not used. Therefore the light-detection region includes no defective portion by not activating the defective portion. Such a series of flows is controlled by the control circuit 95. If there is a SPAD with a large dark count, the number of signals of that column will increase, and may not be able to be distinguished from signals due to incident reflected light L2. Accordingly, the dark count test, i.e., identifying of defective SPADs in FIG. 7 (S4) has to be completed before identifying light-receiving columns (S5) and identifying light-receiving rows (S6).

Next, identifying of a light-receiving column (S5) and identifying of a light-receiving row (S6) to select a SPAD (i, j) overlaying the projection region PA will be described with reference to FIG. 9. FIG. 9 is a flowchart illustrating the process of selecting columns and rows to activate at the photodetector 80.

As illustrated in FIG. 9, after having turned on the power of the flight time measurement device 10 (S31), the column selecting circuit 91 activates column selection line C1 only for selected column No. j that satisfies C(j)=0 (S32), based on C(j) obtained from the results of the identifying of defecting SPADs (S4). The row selecting circuit 92 turns all switches SWi on (closed) (S33). In this state, a test piece is illuminated by the pulse light L1 (S34), and reflected light L2 is received (S35). The photon detection count from the reflected light L2 is recorded in the column counter CTj for the selected column No. j that has been activated at this time. The results of the column counters CTj are read out in S36 through S42, and only selected column Nos. where there were counts equal to or larger than a specification value are selected. Thus, columns where the reflected light L2 does not reach can be excluded.

Specifically, in S36, initial settings are made where selected column No. j=1, and in S37 only selected column Nos. j that have passed the defective SPAD identification (S4) test are selected. In S38, the count Nj of the column counter CTj is read out, and in S39, in a case where the count Nj is smaller than the specification value, G(j)=1 is set, thereby excluding the selected column No. j. In S42, the selected column No. j is incremented by 1 (S41), and in a case where the selected column No. j is m or smaller (S42) the flow returns to S37. Accordingly, selected column Nos. where there are no dark count abnormalities and the reflected light L2 is detected can be selected, and the results are recorded in G.

Next, selection of selected. row No. i having SPADs (i, j) overlaying the projection region PA will be described. First, initial settings are made where selected row No. i=1, and also all H(i) are set to 0 (S43). This H(i) is memory for recording whether the selected row No. i is valid or not in receiving the reflected light L2. H(i)=0 is valid, and H(i)=1 is invalid. Next, only selected column Nos. j satisfying G(j)=0 are activated, based on the G(j) obtained in the testing so far (S44).

Thereafter, whether each row receives reflected light L2 from the pulse light L1 or not is tested in the loop from S45 to S53. Specifically, the switch SWi of a selected i'th row is turned on (closed) by the row selecting circuit 92 (S45), the test piece is illuminated by the pulse light L1 (S46), and the reflected light L2 is received (S47). Subsequently, the accumulated value Nj of the column counters CTj of each column is read out, and the summation circuit 93 calculates ΣNj (S48). Determination is then made in S49 whether ΣNj is smaller than a specification value or not. If ΣNj is smaller than the specification value, the selected row No. i is deemed not to contribute to reception of the reflected light L2, and H(i)=1 is set (S50). On the other hand, if ΣNj is equal to or greater than the specification value, the selected row No. i contributes to reception of the reflected light L2, so the selected row No. i is incremented by 1 (S51) with H(i)=0 remaining set, and in a case where the selected row No. i is n or smaller (S52) the flow returns to S45. If the selected row No. is larger than n (S52), the test ends (S53).

Thus, selecting selected column Nos. j satisfying G(j)=0 and selected row Nos. i satisfying H(i)=0 enables selection of a group of SPADs (i, j) overlaying the projection region PA. G(j) and H(i) are stored in the memory 96.

Next, an example of deciding time-of-flight (ToF) by the ToF measuring unit 94 illustrated in FIG. 1 will be described. With regard to one emission of pulse light L1 from the flight time measurement device 10 illustrated in FIGS. 2 and 3, measurement values N(0), N(1), . . . , N(lm) of reflected light L2 measured each ΔT from emission of the pulse light L1 is stored in the ToF measuring unit 94 of the photodetector 80 illustrated in FIG. 1. In the present embodiment, ΔT is set to half the pulse width of the pulse light L1, for example.

Figure 10:
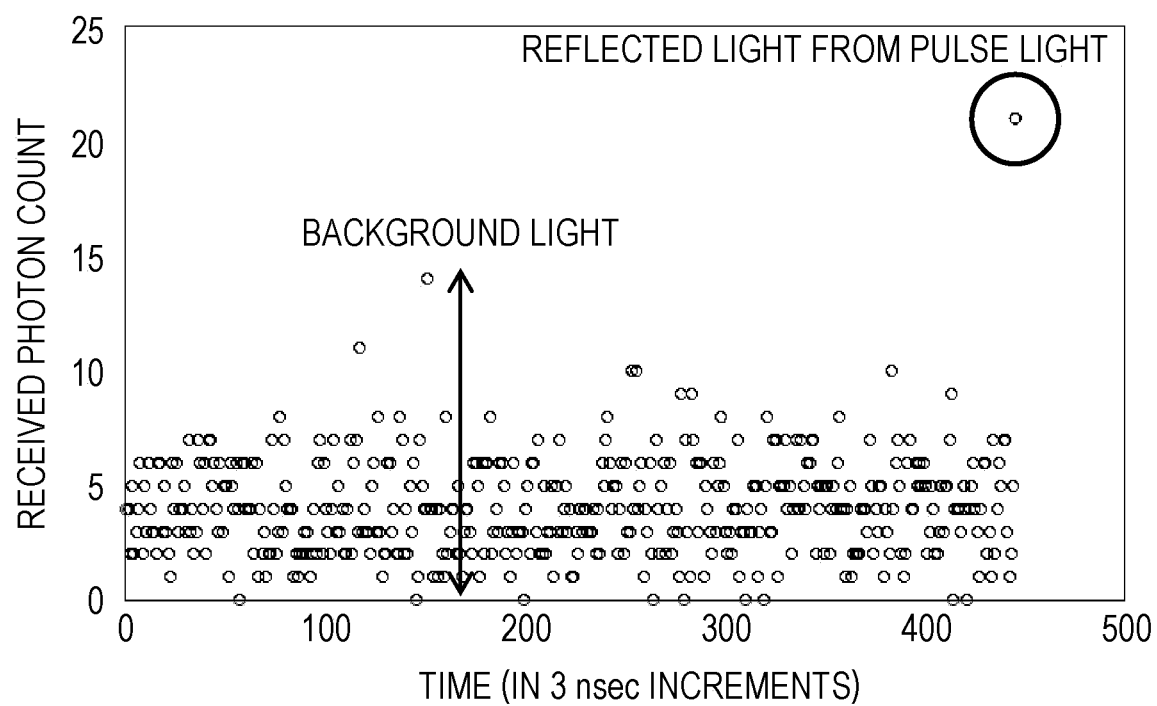
FIG. 10 is a diagram illustrating measurement results at the flight time measurement device.

FIG. 10 illustrates an example of N(1). FIG. 10 is a diagram illustrating measurement results by the flight time measurement device 10. It can be seen from FIG. 10 that the greater part of N(1) is signals from background light, and that signals exceeding the signal level Nb from background light are reflected light L2 from the pulse light L1 from the object M. It should be noted, however, that the measurement value N(1) exhibits a Poisson distribution as illustrated in FIG. 10, so variance is great, and care is to be taken when deciding the signal level Nb of background light.

The signal level Nb of background light is decided as follows. First, an average value [N] of N(1) is obtained. In a Poisson distribution, dispersion is equal to the square root of the average value, so the signal level Nb of background light can be written as [N]+α·∞[N]. α is a constant of around 3 to 5. In the example in FIG. 10, [N]=4.0, and the largest value "14" for the count of received photons corresponds to α=5. Accordingly, setting α to 5 which is large enables noise due to background light to be avoided and just the reflected light L2 from the object M to be detected.

On the other hand, setting α=3, for example, gives a background light signal level Nb=11. Accordingly, the two received photon counts of "12" and the largest value "14" are not excluded, but an object M of which the signal strength of the reflected light L2 of the pulse light L1 is weak and only gives the received photon count of 12 can be recognized as being an object. Accordingly, the value of α may be changed between a case where detection is being broadly made of those where there is a possibility of being an object, even if a certain amount of noise is picked up, and a case where those that have a possibility of being noise are maximally excluded and only those that are an object with certainty are to be detected. Thus, the ToF measuring unit 94 functions to decide the signal level Nb of background light from the series of N(1) that has been stored, extract signals exceeding the signal level Nb of background light as the object, and obtain the flight time thereof. In the description above, description has been made regarding one pulse of pulse light L1, but this is the same regarding a case of measuring multiple pulses of pulse light and taking the results thereof as N(1).

Control-and-Power-Source Unit and Driving-and-interfacing Unit

Next, the control-and-power-source unit 20 and driving-and-interfacing unit 40 illustrated in FIG. 2 will be described.

First, the driving-and-interfacing unit 40 directs the housing 30 to a predetermined rotational angle. Synchronously with this, the control-and-power-source unit 20 causes the flight time measurement device 10 to emit pulse light, thereby illuminating the object M by the pulse light L1. Measurement of reflected light L2 is started at the same time as pulse light emission.

The flight time that the flight time measurement device 10 has decided is externally sent from the driving-and-interfacing unit 40 along with information of the rotational angle, via the control-and-power-source unit 20. Note that details of the control-and-power-source unit 20 and driving-and-interfacing unit 40 will be omitted from description since known technology can be applied.

Description of Effects

Effects were verified under the following conditions and method, using the flight time measurement device 10 of the optical radar device 1 according to the present embodiment. Light emission conditions of the pulse light L1 emitted from the pulse emitter 70 of the flight time measurement device 10 were light emission wavelength of 905 nm, peak power of 31 W, and pulse width of 6 nsec. The size of the light-emission region of the edge emitting laser chip in the pulse emitter 70 was P=200 μm and U=10 μm. The angle of divergence of light at near-field was 25 degrees in the X direction and 10 degrees in the Z direction.

As for the light detection portion 81 of the photodetector 80, 21 rows×51 columns of 7-μm-square SPADs, for a total of 1071 SPADs, were arrayed in a 147 μm×357 μm region. When arraying, relative positional deviation of the pulse emitter 70 from the respective design positions was assumed to be generally within ±50 μm on both the Z direction and X direction and the same situation was assumed for the photodetector 80, and being able to measure without decrease in sensitivity within this range was set as a standard.

The light detection portion of the photodiode PD of the SPAD illustrated in FIG. 5 was a circular shape 4.5 μm in diameter, with a quantum efficiency of 15%.

For the optical band-pass filter 68 illustrated in FIG. 3, an interference filter was used that had a central wavelength transmission band of 905 nm, and a transmission band width of 45 nm. The lens 50 had a focal length of 75 mm and f-number of 2.8 (optical aperture of 26.8 mm). The angle of divergence of the pulse light L1 after passing the lens 50 was ±0.004 degrees in the X axis direction and ±0.08 degrees in the Z axis direction. A cubic polarizing beam splitter, 15 mm on each side, was used for the polarizing beam splitter 60, with the center thereof disposed at a position 40 mm from the lens 50. The photodetector 80 was disposed at the focal position of the lens 50, via the optical band-pass filter 68, quarter wavelength plate 51, and polarizing beam splitter 60. In the same way, the pulse emitter 70 was disposed at the focal position of the lens 50, via the quarter wavelength plate 51 and polarizing beam splitter 60. While the center of the light emission region of the edge emitting laser chip in the pulse emitter 70 was positioned to be on the optical axis of the lens 50, there was error in the order of tens of μm in both the Z axis direction and X axis direction. In the same way, the center of the light detection portion 81 was positioned to be on the optical axis of the lens 50, but error in the order of tens of μm occurred here as well. These errors are errors expected from substrate working precision, precision of mounting chips onto substrates, and so forth.

After assembly, the processes of S2 through S4 in FIG. 7 were performed as a method of verification. The dark count of SPAD (12, 43) was great, so column j=43 was not used.

Next, a white sheet of paper was placed as a test piece at a point 100 m away from the flight time measurement device 10, this sheet of paper was illuminated by the pulse light L1, and the column and row selection process illustrated in the flowchart in FIG. 9 was performed. Note that the position of setting up the test piece preferably is as distant as possible, and close to the maximum ranging distance if feasible. Thus, the light-detection region RA effective near the maximum ranging distance can be identified. This process was performed in the dark.

Figure 11:
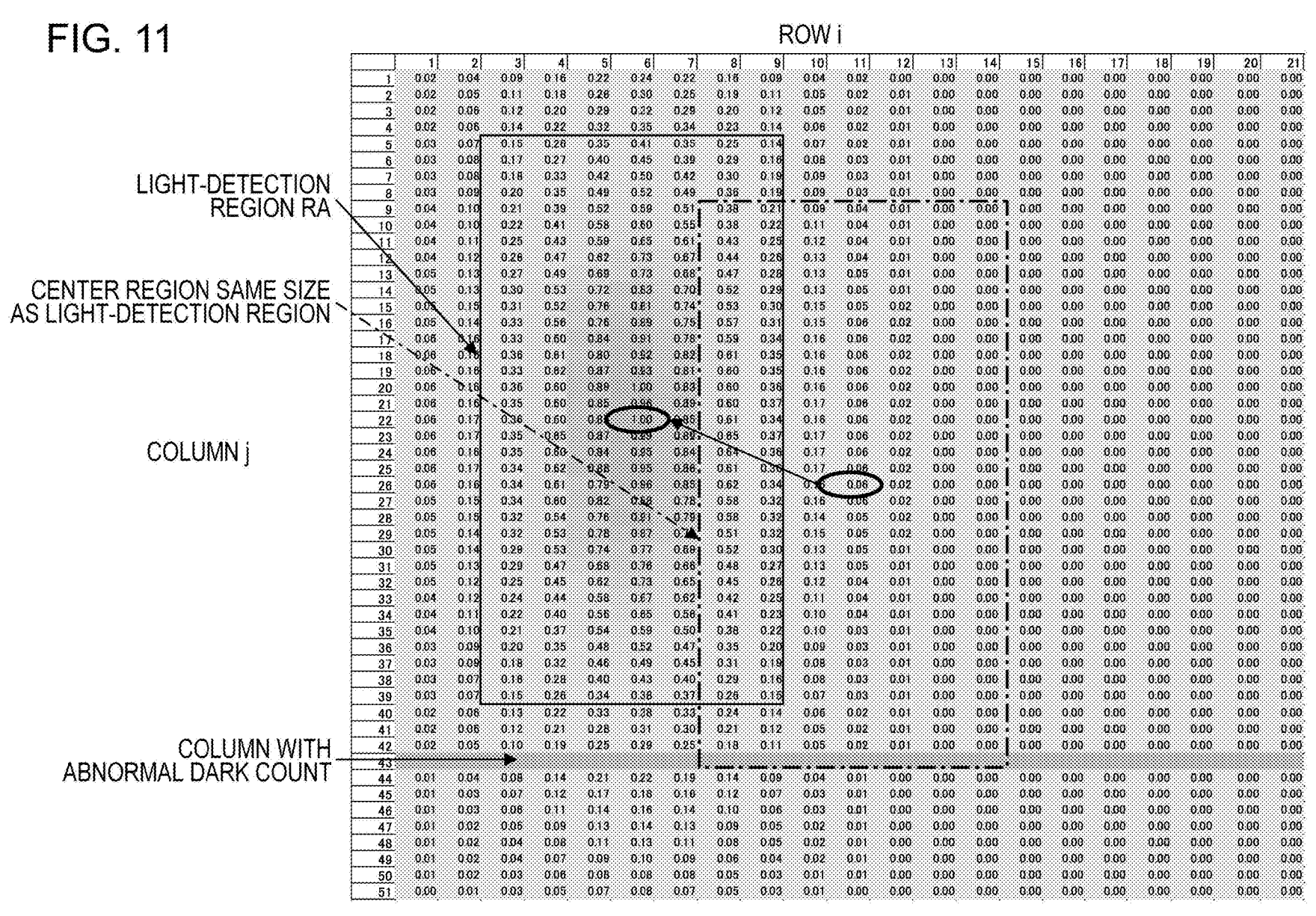

An example of measurement results is shown in FIG. 11. FIG. 11 is a diagram illustrating reception intensity distribution at the photodetector 80 of the flight time measurement device 10. Note that the positions of rows and columns are inverted in FIG. 11, due to diagram drafting considerations. The reception intensity measured at the timing of flight time was accumulated 1000 times, and normalized with the largest value as 1.

Selected row No. i=3 through 9 and selected column No. j=5 through 39 were effective as the light-detection region RA, as indicated by a solid line frame in FIG. 11. That is to say, the number of effective SPADs in the light-detection region RA was 7×35=245, which was approximately 23% of the entire 1071. It can be seen from FIG. 11 that not all SPADs detecting even slight reflected light L2 are comprehensively included as the light-detection region RA. The S/N ratio can be improved by using SPADs where the signals of the reflected light L2 are substantially stronger than the background light as the light-detection region RA. In a case where a rectangular light-detection region RA is set as to an elliptical projection region PA as in the present configuration, there may be cases where signals of reflected light L2 are weak at SPADs at the corners, but it is preferable that the signals of reflected light L2 are stronger than background light signals at the greater part of the SPADs.

It can be seen from the single-dot dashed line frame in FIG. 11 that while the originally designed center was SPAD (i, j)=SPAD (11, 26), the actual center of the light-detection region RA was SPAD (i, j)=SPAD (6, 22), meaning that the relative positional deviation was −35 μm (i.e., 5×7 μm) in the Z direction, and −28 μm (i.e., 4×7 μm) in the X direction. The defective column j=43 was not included in the light-detection region RA in this example, so there was no effect of the defective column.

The count of received signals of the above-described valid 245 SPADs was approximately 75% of the count of received signals at all SPADs excluding column 43, meaning that approximately ¾ of the reflected light L2 from the pulse light L1 was captured by the valid region. The count of received signals of a region the same size as the light-detection region RA (7 rows by 35 columns) at the center of the photodetector 80 was approximately 19%.

Accordingly, in a case where there is no configuration to cover for positional deviation between the pulse emitter 70 and the photodetector 80, as in the present configuration, the amount of signals would drop to approximately ¼ (i.e., 19%/75%). Since the amount of background light signals does not change, the S/N ratio would also drop to ¼, and the maximum ranging distance would be markedly reduced.

On the other hand, in a case of using all 1071 SPADs at all times, a signal amount around that of the present configuration can be obtained at all times for the reflected light L2 signals of the pulse light L1, as long as the range of positional deviation is within ±75 μm. However, in this case, the reflected light of background light increases to 4.4 times (i.e., 1071/245), so the S/N ratio will drop, and the maximum ranging distance will be shorter.

FIG. 10 illustrates the results of placing the test piece at a position 200 m from the flight time measurement device 10 and measuring flight time. This measurement was performed on a sunny day in July, and background light was very strong. The greatest photon count from background light was 14, and the average was 4.0.

As a result, signals sufficiently greater than the greatest background light were obtained even at a distance of 200 m. In repeated measurement, the average count of signals from the test piece was 26.7, the largest count was 36, and the smallest count was 16. Accordingly, the maximum ranging distance of which the present configuration is capable of is around 200 m.

However, even if the same light-detection region as the present configuration is provided but no positional deviation correction mechanism is provided, the reflected light intensity of the pulse light L1 is ¼ while the background light signal amount is unchanged, as described above, so the maximum ranging distance will be 100 m or less. In a case of using the entire region of the photodetector 80 according to, the present embodiment as the light-detection region, an increase of around 10% to 20% in reflected light signal intensity can be expected, but the background light intensity will be 4.4 times, so the background light signal count illustrated in FIG. 10 will increase to around 38. Accordingly, the maximum range will be around 130 m to 140 m.

Note that if the distance to the object M is short, the projection region PA enlarges to cover the light-detection region RA determined for a distant object, and further the quantity of light received increases in inverse proportionate to the distance squared, so there is no adverse effect on flight time measurement.

As described above, the light-detection region of the photodetector 80 is configured to include the projection region PA of the illumination region IA of pulse light L1 on the object M projected on the photodetector 80, as in the present configuration, and in a case where the optical axes of the photodetector 80 and pulse emitter 70 deviate at the time of assembly, only the portion on the photodetector 80 including the projection region PA is activated. As a result, a high S/N ratio can be realized. Thus, precise positioning unnecessary and assembly precision of the flight time measurement device 10 can be relaxed, so productivity can be improved while reducing assembly costs. Also, a high S/N ratio can be realized and the maximum ranging distance can be markedly improved by utilizing just the light detection portion 81 where the reflected light L2 of the pulse light L1 reaches at all times.

First Modification

Figure 12:
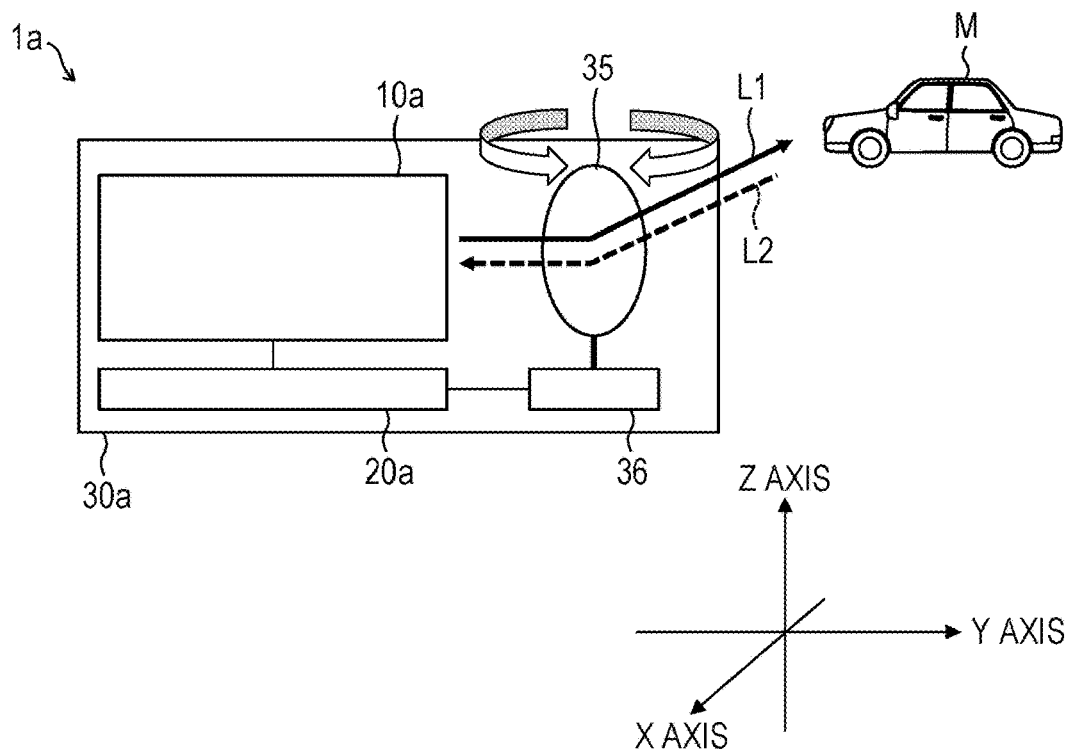
FIG. 12 is a schematic diagram illustrating the configuration of a first modification of an optical radar device according to the first embodiment of the present disclosure.

The configuration of an optical radar device 1a that is a first modification of the optical radar device 1 according to the first embodiment will be described with reference to FIG. 12. FIG. 12 is a schematic diagram illustrating the configuration of the optical radar device 1a in the first modification of the first embodiment.

The optical radar device 1a differs from the optical radar device 1 with regard to the point that the measurement region is scanned by a reflecting mirror instead of a rotating mechanism, as illustrated in FIG. 12. However, a flight time measurement device 10a has the same functions as the flight time measurement device 10. The housing 30a does not nave to be rotated, so reduction in size, weight, and electric power consumption is easy. The reflecting mirror is good in that two-dimensional scanning can be performed.

In detail, the optical radar device 1a according to the first modification includes the flight time measurement device 10a that illuminates the object M by the pulse light L1 and receives the reflected light L2 from the object M, a control-and-power-source unit 20a that supplies electric power to the flight time measurement device 10a and controls the timing of emitting pulse light L1 and of receiving reflected light L2, a mirror 35 that reflects the pulse light. L1 toward the direction of illumination, a mirror driving unit 36 that controls the direction in which the mirror 35 is facing, and housing 30a that accommodates these.

The housing 30a has a window through which the pulse light L1 and reflected light L2 pass. The window may have a hood such as a transparent cover or the like, to avoid adhesion of obstructions such as raindrops, mud, foreign matter, or the like. The hood may have a filtering function to cut out light such as visible light that does not contribute to ranging.

In the optical radar device 1a of this configuration, the reflected light L2 is reflected at the mirror 35 and reaches the flight time measurement device 10a. A control-and-power-source unit 20a includes functions to decide the direction in which the mirror 35 faces, and give instructions to the mirror driving unit 36. The control-and-power-source unit 20a also includes interface functions to externally output the measurement results. The coordinate axes are the same as in the above-described FIG. 2. In a case where the mirror 35 rotates on the Z axis as the rotational axis, within the X-Y plane is one-dimensionally scanned, in the same way as with the optical radar device 1. Z axis direction scanning can also be performed by adding rotation of the mirror 35 on an axis that is orthogonal to the Z axis and that intersects the X axis at 45 degrees, in addition to rotation on the Z axis.

The positional relation between the flight time measurement device 10a and the mirror 35 within the optical radar device 1a is not restricted to that in FIG. 12, and can be decided according to usage. For example, by setting the optical axis of the flight time measurement device 10a to the Z axis direction, and controlling the rotation of the mirror 35 on the Z axis and the angle as to the Z axis, the X-Y plane can be covered 360 degrees, and also the pulse light L1 can be scanned in the Z axis direction, and a region can be measured over a wide range. The mirror 35 may be a Galvano mirror or a microelectromechanical system (MEMS) mirror.

The optical radar device 1a uses the flight time measurement device 10a that realizes a light-detection region suitable for the illumination region IA of the pulse light L1, and markedly relaxes position precision of the photodetector 80 as to the pulse emitter 70, and thus can markedly increase maximum ranging distance and reduce costs. Accordingly, the maximum ranging distance of the optical radar device 1a can be increased and manufacturing costs reduced. The optical radar device 1a also has features that two-dimensional scanning can be performed, and that reduction in size is easy.

Second Modification

Figure 13:
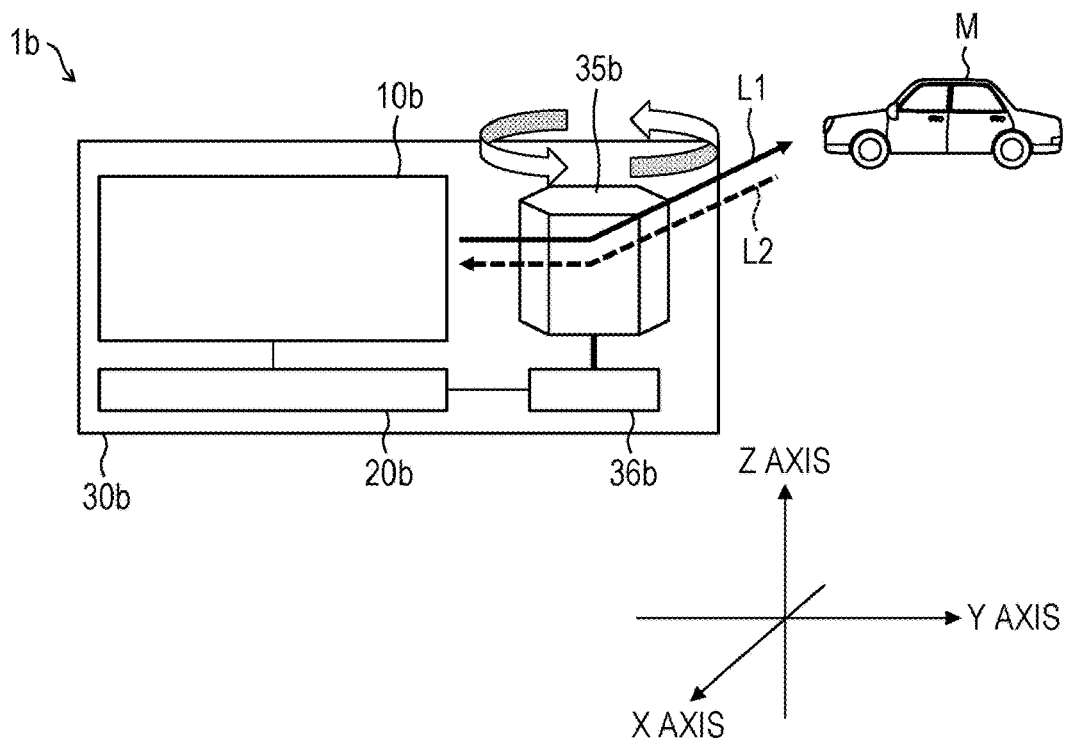
FIG. 13 is a schematic diagram illustrating the configuration of a second modification of an optical radar device according to the first embodiment of the present disclosure.

The configuration of an optical radar device 1b that is a second modification of the optical radar device 1 according to the first embodiment will be described with reference to FIG. 13. FIG. 13 is a schematic diagram illustrating the configuration of the optical radar device 1b according to the second modification of the first embodiment.

The optical radar device 1b differs from the optical radar device 1 with regard to the point that the measurement region is scanned by a polygon mirror instead of a rotating mechanism, as illustrated in FIG. 13. However, a flight time measurement device 10b has the same functions as the flight time measurement device 10. The housing 30b does not have to be rotated, so reduction in size, weight, and electric power consumption is easy. The polygon mirror is good in that two-dimensional scanning can be performed.

In detail, the optical radar device 1b according to the second modification includes the flight time measurement device 10b that illuminates the object M by the pulse light L1 and receives the reflected light L2 from the object M, a control-and-power-source unit 20b that supplies electric power to the flight time measurement device 10b and controls the timing of emitting pulse light L1 and of receiving reflected Eight L2, a polygon mirror 35b that reflects the pulse light L1 toward the direction of illumination, a mirror driving unit 36b that controls the rotation of the polygon mirror 35b, and housing 30b that accommodates these.

The housing 30h has a window through which the pulse light L1 and reflected light L2 pass. The window may have a hood such as a transparent cover or the like, to avoid adhesion of obstructions such as raindrops, mud, foreign matter, or the like. The hood may have a filtering function to cut out light such as visible light that does not contribute to ranging.

In the optical radar device 1b of this configuration, the reflected light L2 is reflected at the polygon mirror 35b and reaches the flight time measurement device 10h. A control-and-power-source unit 20b includes functions to decide the direction in which the polygon mirror 35b faces, and give instructions to the mirror driving unit 36b. The control-and-power-source unit 20b also includes interface functions to externally output the measurement results. The coordinate axes are the same as in the above-described. FIG. 2. In a case where the inclination angle of the mirror face of the polygon mirror 35b is constant, and rotates on the Z axis as the rotational axis, within the X-Y plane is one-dimensionally scanned, in the same way as with the optical radar device 1. Setting the inclination angle of the mirror faces of the polygon mirror 35b as to the Z axis to be different angles enables horizontal scanning at multiple different angles in the Z axis direction.

The positional relation between the flight time measurement device 10b and the polygon mirror 35b within the optical radar device 1b is not restricted to that in FIG. 13, and can be decided according to usage.

The optical radar device 1b uses the flight time measurement device 10b that realizes a light-detection region suitable for the illumination region IA of the pulse light L1, and markedly relaxes position precision of the photodetector 80 as to the pulse emitter 70, and thus can markedly increase maximum ranging distance and reduce costs. Accordingly, the maximum ranging distance of the optical radar device 1b can be increased and manufacturing costs reduced. The optical radar device 1b also has features that two-dimensional scanning can be performed, and that reduction in size is easy.

Thus, the photodetector 80 according to the present embodiment measures flight time by the lens 50 serving as an imaging optical element imaging reflected light L2 from the illumination region IA on the object M illuminated by the pulse light L1, which is received by the light detection portion 81. The light detection portion 81 is formed larger than the projection region PA, reflected at the illumination region IA on the object P and imaged on the light detection portion 81, with the portion of the light detection portion 81 that overlays the projection region PA being activated as the light-detection region. Note that activation means a state where incident photons can be detected. Accordingly, at least the illumination region of the object can be imaged on the light detection portion, and imaging on the light detection portion can be realized even if there are deviations in relative positions of the photodetector and light-emitting element to the optical axes.

Also, in the photodetector 80 according to the present embodiment, the portion of the light detection portion 81 that overlays the projection region PA is activated as the light-detection region. As a result, just the illumination region IA of the object M is the object of measurement, so the intensity ratio as to background light can be raised, and reduction in the maximum ranging distance can be avoided. Accordingly, a light-detection region suitable for the illumination region IA of pulse light L1 can be realized, and also a photodetector 80 where positioning precision of the photodetector 80 as to the pulse emitter 70 is markedly relaxed can be realized.

The flight time measurement devices 10, 10a, and 10b according to the present embodiment include at least the pulse emitter 70, polarizing beam splitter 60, lens 50 serving as an imaging optical element, and photodetector 80. The pulse emitter 70 causes pulse light L1 to pass through the polarizing beam splitter 60 and the lens 50 in that order and illuminate the object M, and reflected light L2 from the object M passes through the lens 50 and polarizing beam splitter 60 in that order and is imaged at the photodetector 80. Further, the pulse emitter 70 and the photodetector 80 are each disposed at a focal position on one side of the lens 50.

Accordingly, the reflected light L2 from the illuminated illumination region IA on the object M illuminated by the pulse light L1 can be imaged in a sure manner by the lens 50 and received at the light detection portion 81. Accordingly, a light-detection region suitable for the illumination region IA of pulse light L1 can be realized, and also a photodetector 80 where positioning precision of one photodetector 80 as to the pulse emitter 70 is markedly relaxed can be realized, thereby realizing flight time measurement devices 10, 10a, and 10b where costs can be reduced without reduction in maximum ranging distance.

The optical radar devices 1, 1a, and 1b according to the present embodiment include the flight time measurement devices 10, 10a, and 10b, respectively. This is good in that occurrence of blind spots near the optical radar devices 1, 1a, and 1b can be avoided, and an optical radar device capable of measuring long distances can be realized. Also, an optical radar device 1 that can increase the maximum ranging distance without being affected by manufacturing variance. Note that the scanning mechanisms for pulse light L1 and reflected light L2 in the optical radar devices 1, 1a, and 1b are not restricted to rotation mechanisms and mirrors, and that the same advantages can be obtained by using non-mechanical scanning system such as a beam scanning device using liquid crystal polarization grating.

Second Embodiment

An embodiment of the present disclosure will be described with reference to FIGS. 14 through 19. The configuration of an optical radar device 1c according to a second embodiment differs from the optical radar device 1 according to the first embodiment with regard to the configuration of a photodetector 80c, and otherwise is the same as the optical radar device 1.

Photodetector

Figure 14:
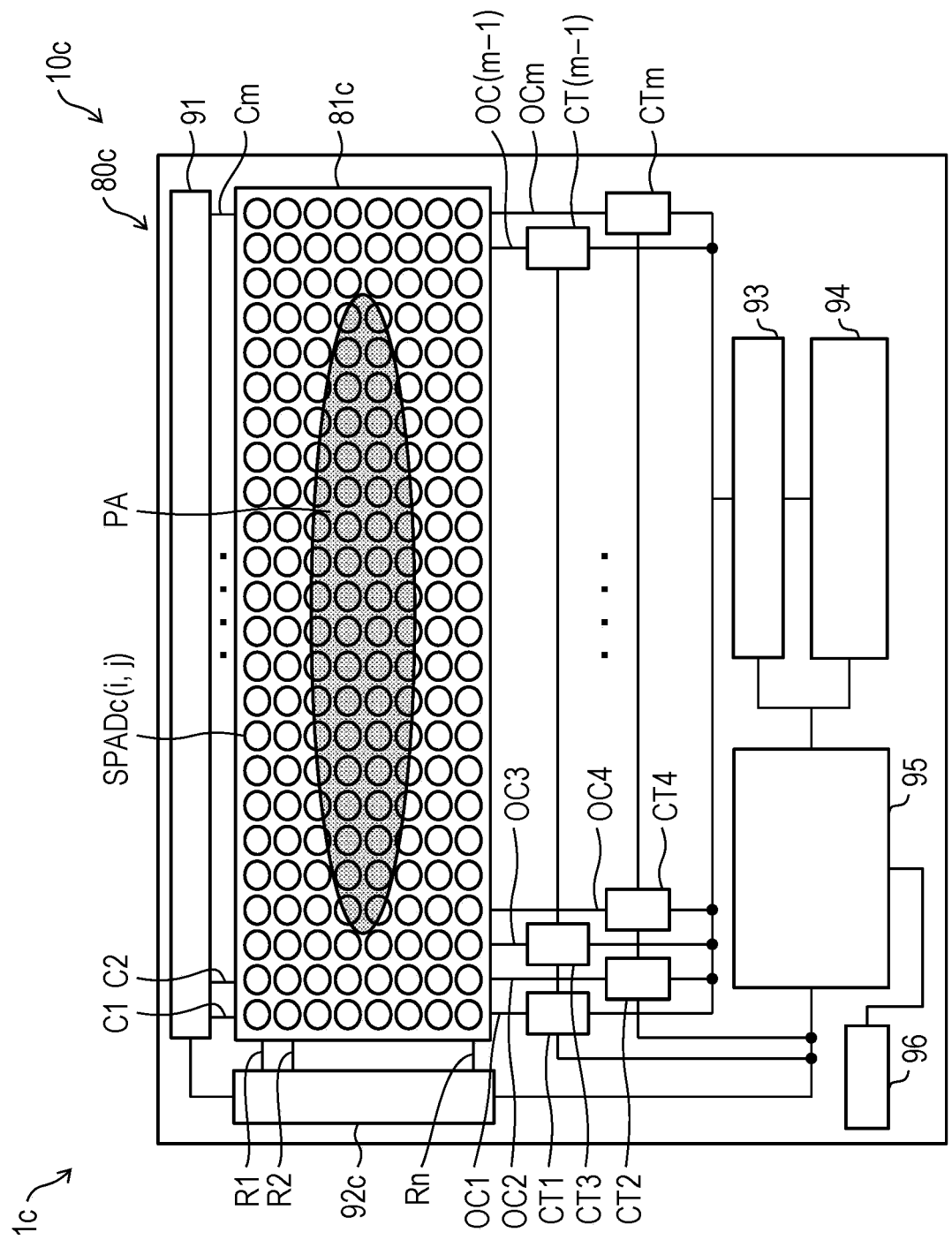
FIG. 14 is a schematic diagram illustrating the configuration of photodetector according to a second embodiment, provided to the flight time measurement device according to the present disclosure.
Figure 15:
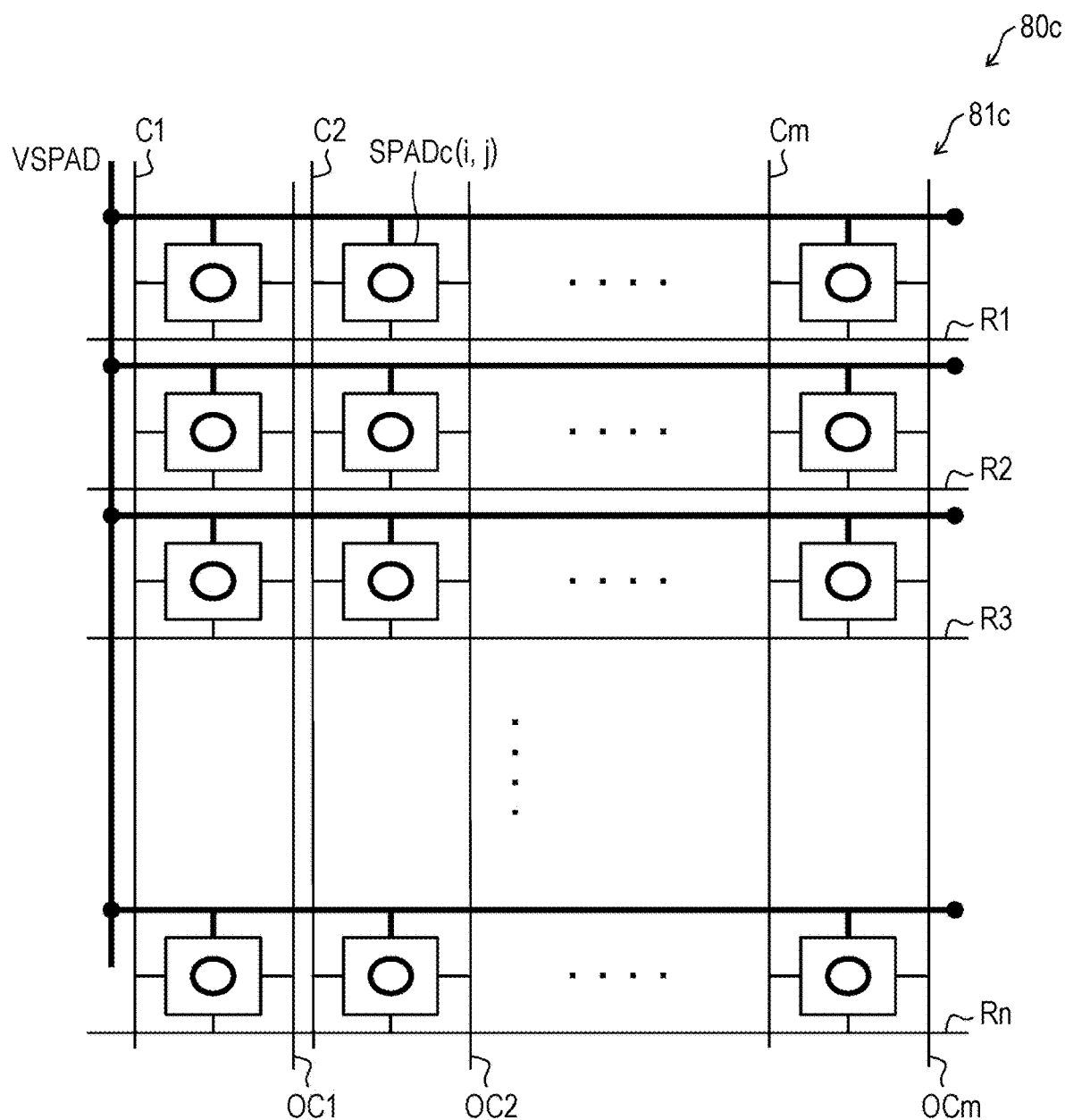
FIG. 15 is a schematic diagram illustrating the configuration of a SPAD array making up the light detection portion of the photodetector.

The configuration of the photodetector 80c according to the present embodiment will be described with reference to FIGS. 14 and 15. FIG. 14 is a schematic diagram illustrating the configuration of the photodetector 80c of the flight time measurement device 10c provided in the optical radar device 1c according to the present embodiment. FIG. 15 is a schematic diagram illustrating the configuration of a SPADc array making up a light detection portion 81c of the photodetector 80c.

Figure 16:
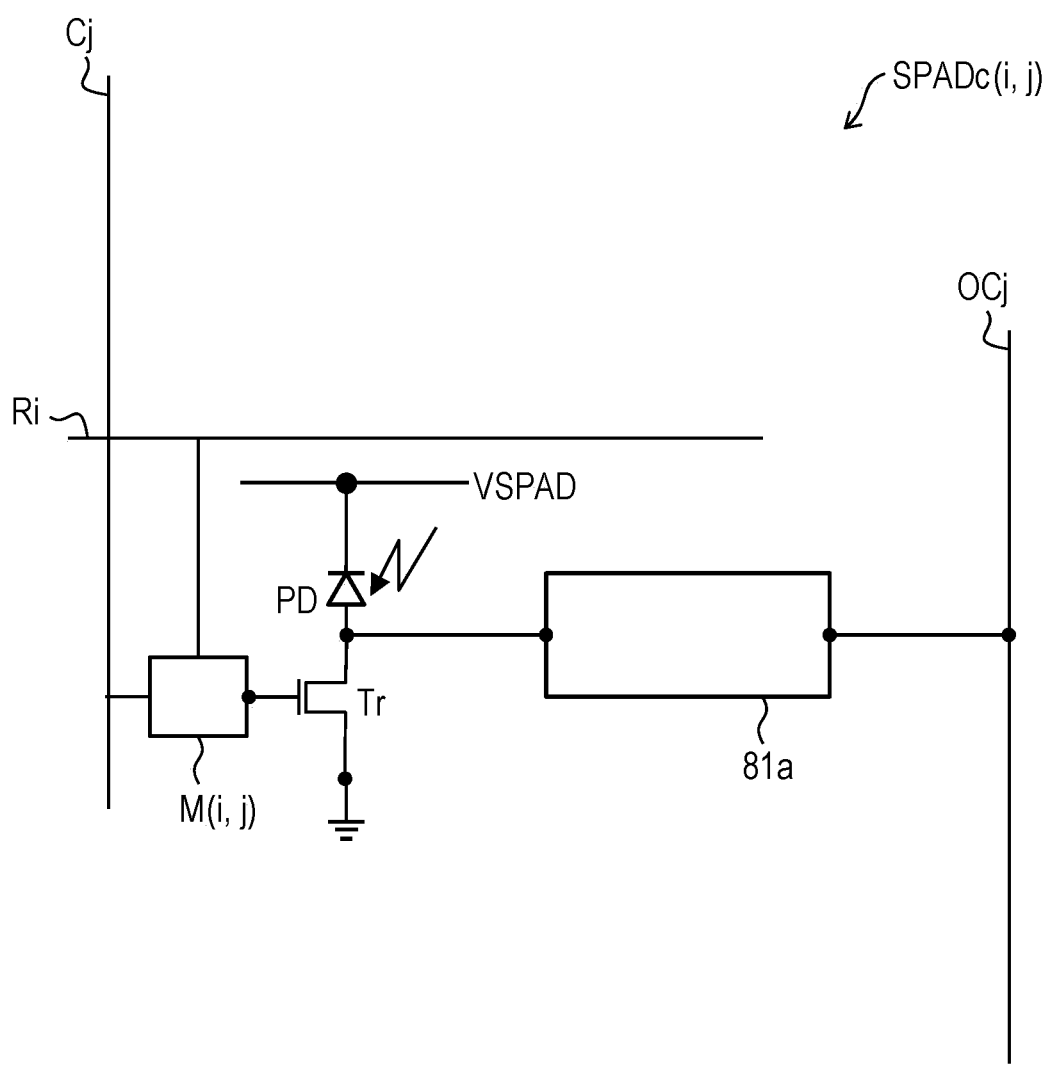
FIG. 16 is a schematic diagram illustrating the configuration of a SPAD making up the light detection portion.

The photodetector 80c according to the present embodiment differs from the photodetector 80 according to the first embodiment illustrated in FIG. 1 with regard to SPADcs (i, j) and the array configuration thereof, and particularly the configuration of a row selecting circuit 92c, as illustrated in FIG. 14. Specifically, the array configuration of the photodetector 80c according to the present embodiment has the SPADcs (i, j) connected to the power line VSPAD, row selection lines Ri, column selection lines Cj, and column signal lines OCj, as illustrated in FIG. 15. That is to say, the SPADcs (i, j) according to the present embodiment are the same as the SPADs (i, j) illustrated in FIG. 5 according to the first embodiment, including the photodiode PD, transistor Tr, and pulse output circuit 81a, as illustrated in FIG. 16. A major point of difference between the SPADcs (i, j) according to the present embodiment and the SPADs (i, j) illustrated in FIG. 5 according to the first embodiment is the control method of the gate electrode of the transistor Tr that sets the photodiode PD to detection mode.

Specifically, the light detection portion 81 of the photodetector 80 in the first embodiment directly controlled the SPADs (i, j) by the column selection lines Cj, as illustrated in FIG. 5, whereas the light detection portion 81c of the photodetector 80c according to the configuration of the present embodiment has the gate electrode of the transistor Tr connected to a storage circuit M (i, j), with the SPADc (i, j) being controlled in accordance with the state of the storage circuit M (i, j), as illustrated in FIG. 16.

In the first embodiment, individual SPADs (i, j) were selected in increments of rows and increments of columns, individual SPADs can be selected individually using the storage circuits M(i, j). As a result, a light-detection region RAc can be set more finely in the present embodiment as compared to the first embodiment. That is to say, while power supply to the SPADs was performed by the row selection lines Ri in the first embodiment, power is supplied to the SPADcs in the present embodiment by the power source line VSPAD. As a result, in the present embodiment, the storage circuits M (i, j) controlling the transistors Tr that are switches for activating the SPADcs are controlled by the row selection lines Ri and column selection lines Cj. It is sufficient for the storage circuits M (i, j) to store at least whether the transistor Tr is on or off, and 1-bit memory is sufficient. It is to be understood in the following that a transistor Tr is on when the storage circuit M (i, j) is in an H state and off when in an L state.

The memory for the storage circuits M (i, j) may be normal static random access memory (SRAM) that reads in external memory when power is turned on and writes to the storage circuits M (i, j), or may be non-volatile memory. In a case of using non-volatile memory, a mode where volatile control can be performed by the row selection lines Ri and column selection lines Cj, and a mode where the non-volatile memory is written to and the transistors Tr are controlled by the written H/L states.

Writing to each of the storage circuits M (i, j) is performed via the row selection lines Ri and column selection lines Cj. For example, in the initial state, all storage circuits M (i, j) are at the L state. Accordingly, if a column selection line Cj is in the H state when a row selection line Ri is activated, that storage circuit M (i, j) goes to the H state, and otherwise maintains the L state. Accordingly, it is sufficient for the row selecting circuit 92c and column selecting circuit 91 to have normal decoding circuit functions.

Thus, although the photodetector 80c according to the present embodiment differs from the photodetector 80 according to the first embodiment regarding the method of selectively activating the SPADcs (i, j), but is the same as the photodetector 80 with regard to the point that only SPADcs (i, j) overlaying the projection region PA are activated. Accordingly, even if there is positional deviation between the projection region PA and the light-detection region RA, the projection region PA can constantly be covered with a minimal number of SPADcs (i, j).

Selection of SPADcs (i, j) to be activated basically follows flowchart illustrated in FIG. 7 regarding the main setup flow for the photodetector 80 according to the first embodiment. However, identification of light-receiving columns and identification of light-receiving rows are not performed separately in the present embodiment, so the identifying of light-receiving columns (S5) and identifying of light-receiving rows (S6) illustrated in FIG. 7 are combined to identifying of light-receiving SPADs.

Figure 17:
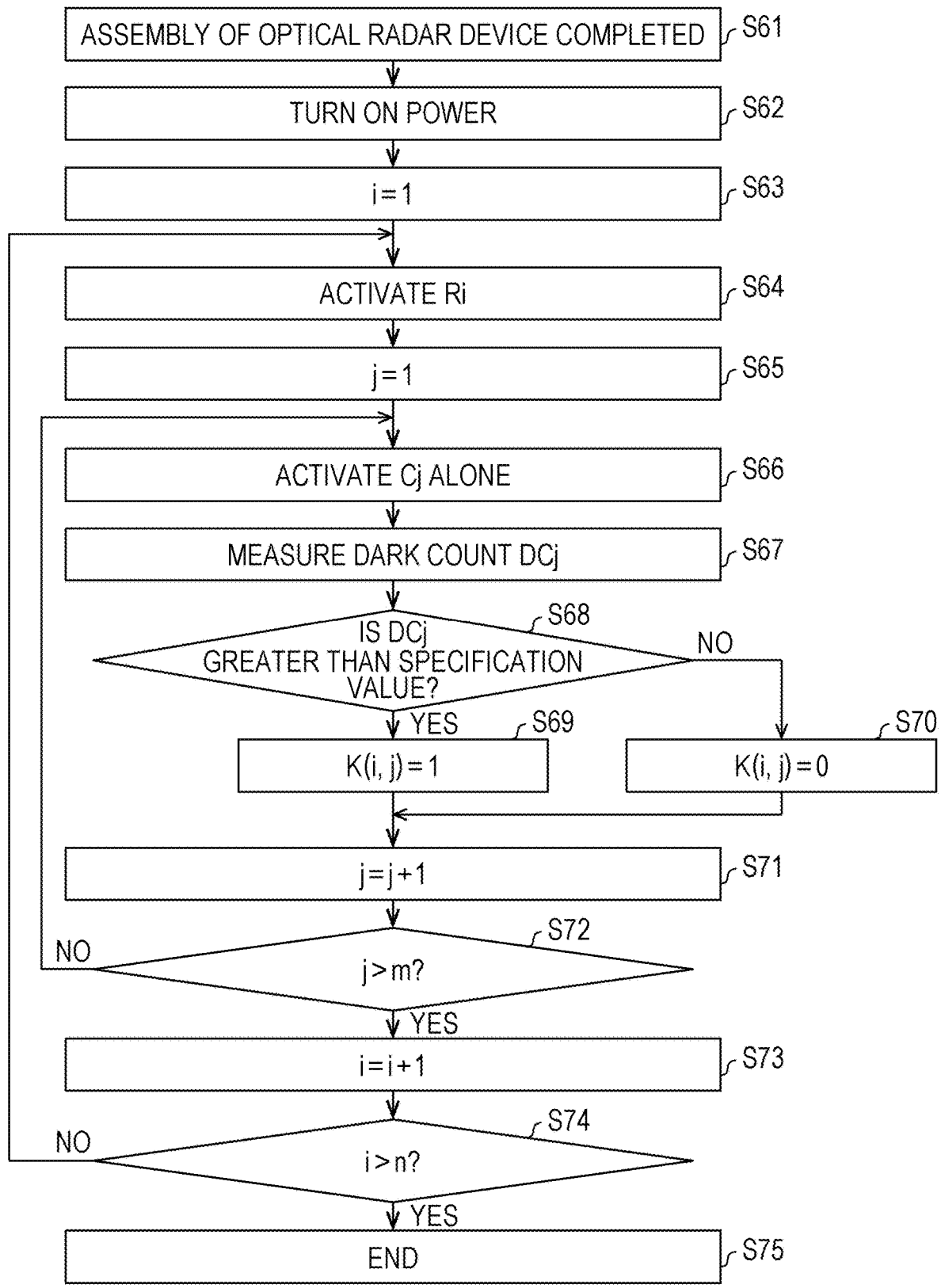
FIG. 17 is a flowchart illustrating a defective SPAD exclusion process for the photodetector.

The process of excluding defective SPADs in the photodetector 80c according to the present embodiment will be described with reference to FIG. 17. FIG. 17 is a flowchart illustrating the defective SPAR exclusion process for the photodetector 80c. Note that FIG. 17 illustrates properties evaluation of SPADs when dark, that is equivalent to identifying of defective SPADs (S4) in the first embodiment in FIG. 7.

Upon assembly of the optical radar device 1c being completed (S61), power is turned on (S62) in FIG. 17. Next, 1 is set to i representing the selected row No., as initial settings (S63). Next, the row selecting circuit 92 activates the row selection line Ri (S64).

S65 through S74 indicate a loop for testing selected column No. 1 through selected column No. m. Specifically, the selected column No. j is first selected in order from selected column No. 1 (S65). Accordingly, the column selection line Cj is activated by the column selecting circuit 91. As a result, SPADc (i, j) is activated, pulse output when dark is accumulated in the column counter CTj (S67), and determination is made regarding whether a cumulative count DCj is greater than a specification value or not (S68). In a case where the cumulative count DCj is greater than the specification value, the SPADc (i, j) is not usable, so K(i, j)=1 is set (S69). On the other hand, if not greater, there is no problem, so K(i, j)=0 is set (S70). Note that K(i, j) is 1-bit memory, and if K(i, j)=0 this indicates that the SPADc (i, j) is usable, while if K(i, j)=1 this indicates that the SPADc (i, j) is unusable. Thereafter, the selected column No. j is incremented by 1 (S71) and the flow returns to S66.

Upon testing is performed of all columns regarding the selected row No. i by the loop from S64 to S72, 1 is added to the selected row No. i (S73), and the flow returns to S64 to transition to the next row. At the point where the selected row No. i exceeds n (S74) the test ends (S75).

Just SPADcs (i, j) with a large dark count can be sorted out in the present configuration, so the effects of defective SPADcs can be suppressed more than with the first embodiment, where the entire column is made unusable. The above series of flows is controlled by the control circuit 95.

Figure 18:
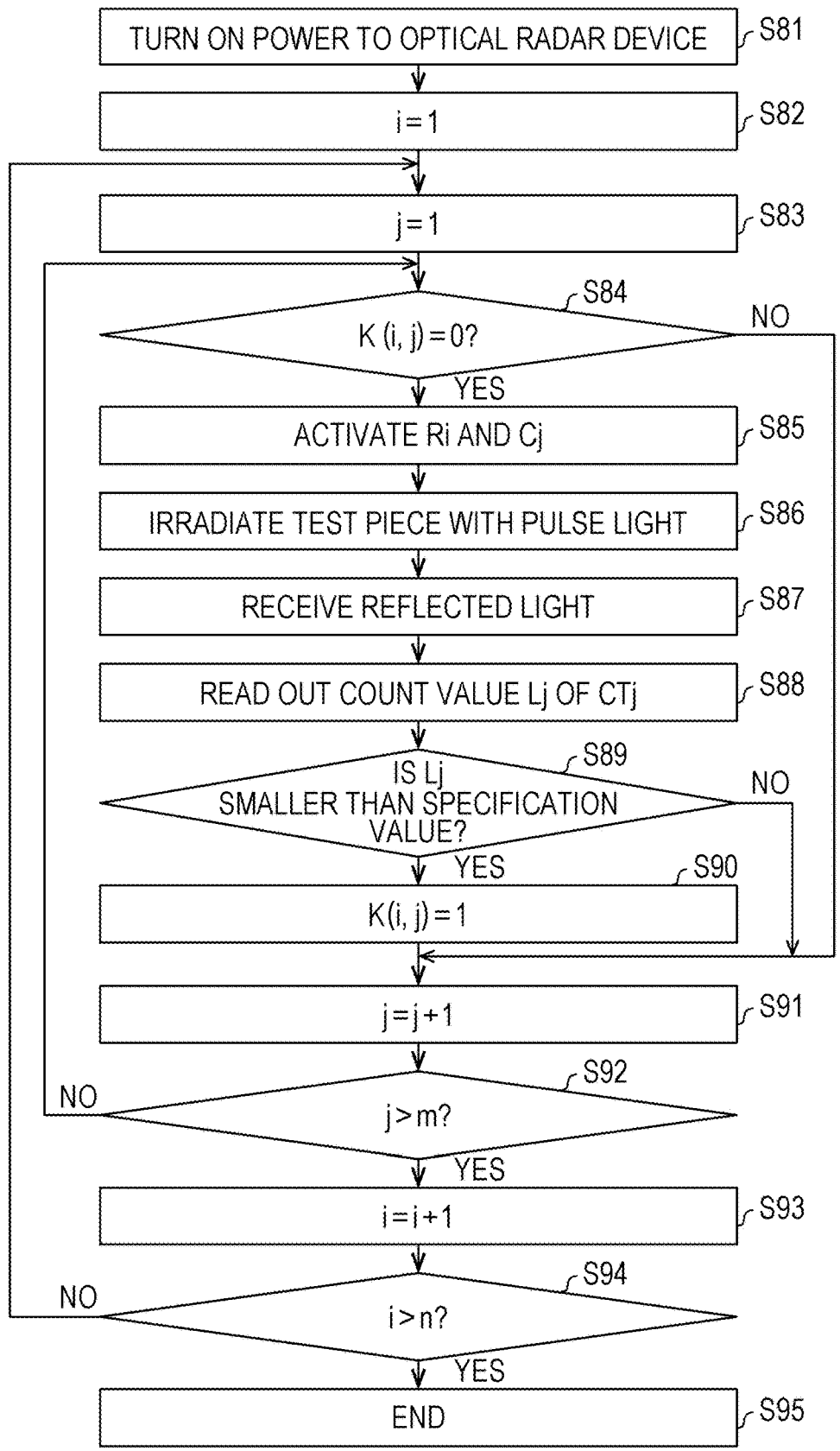
FIG. 18 is a flowchart illustrating a flow for selecting SPADs to activate at the photodetector.

Next, the flow of selecting SPADcs (i, j) overlaying the projection region PA, i.e., identifying of light-receiving SPADs including the identifying of light-receiving columns (S5) and identifying of light-receiving rows (S6) in FIG. 7 will be described with reference to FIG. 18. FIG. 18 is flowchart illustrating the flow of selecting SPADs to activate at the photodetector 80c. Note that placements such as the test piece and so forth, and the measurement conditions, are the same in the flowchart in FIG. 18 as in the first embodiment.

As illustrated in FIG. 18, after having turned on the power of the optical radar device 1c (581), i representing the selected row No, is set to 1 in the initial state (S82). After having set j representing the selected column No. to 1 (S83), the received light quantity is checked for all selected column. Nos. j in the flow from S84 to S94.

Specifically, a SPADc (i, j) of selected column No. j where K (i, j)=1 based on the K(i, j) obtained in the flowchart in FIG. 17 has a dark count defect, so the light-reception quantity is not checked, and the flow skips to S91. The judgment process thereof is S84.

After S84, the row selection line Ri and column selection line Cj are activated by the row selecting circuit 92c and column selecting circuit 91 (S85). In this state, the test piece is illuminated by the pulse light L1 (586), and the reflected light L2 is received (S87). At this time, the photon detection count from the reflected light L2 is recorded in the column counter CTj of the activated selection column No. j, so the count Lj of the column counter CTj is read out (S88). Next, judgment is made regarding whether or not the count Lj is smaller than the specification value (S89), and in a case where the count Lj is smaller than the specification value, K(i, j)=1 is set (S90). Thus, SPADcs (i, j) where the reflected light L2 does not reach can be excluded.

Next, the selected column No. j is incremented by 1 (S91), and in a case where the selected column No. j is selected column No, m or smaller (192) the flow returns to 184.

Thus, columns where there are not dark count abnormalities and reflected light L2 can be detected are selected, and the results are recorded in K(i, j). Upon checking of all selected column Nos. j ending, the selected row No. i is incremented by 1 (193), and the flow returns to S83 as long as the selected row No. i is selected row No. n or smaller.

Thus, the light-reception quantity of all SPADcs (i, j) is measured, and only SPADcs (i, j) with a light-reception quantity that is a value decided by specifications or above are selected. K(i, j) values are either written to the storage circuits M (i, j) at that time, or stored in memory 96 and written to the storage circuits M(i, j) each time the power is turned on.

Figure 19:
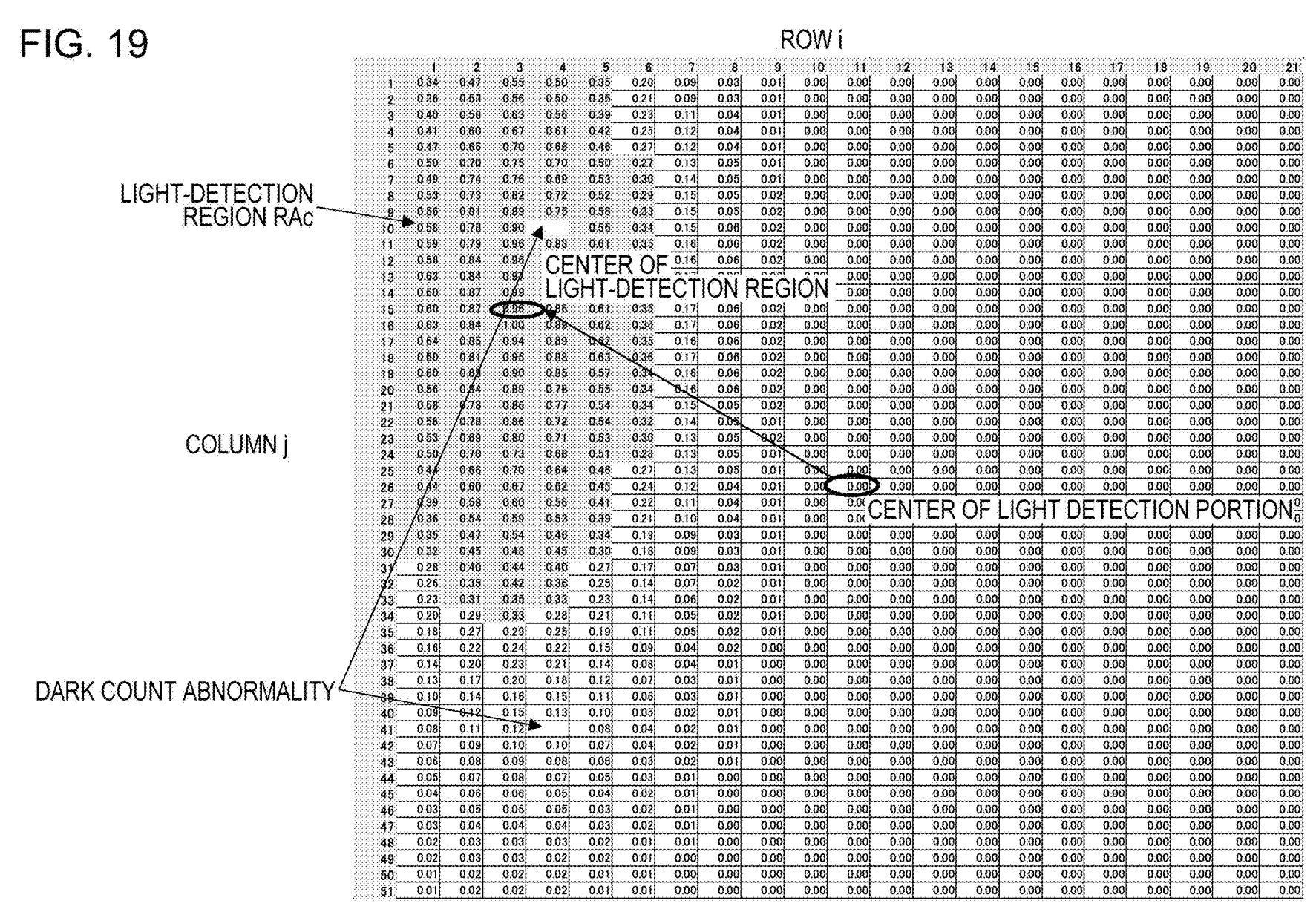

An example of having decided a measurement region by the above-described provides is illustrated in FIG. 19. Note that the positions of rows and columns are inverted in FIG. 19, due to diagram drafting considerations. The reception intensity measured at the Liming of flight time was accumulated 1000 times, and normalized with the largest value as 1. In the present embodiment, portions where the normalized value were 0.3 or higher were taken as the light-detection region RAc (the reason that SPADs lower than 0.3 in normalized value are partly included was interpreted as being due to variance to the lower side). The normalized value of 0.3 here was selected as with signals approximately three times the signal intensity of the greatest background light as a general guide. Thus, but it is preferable that the signals of reflected light L2 are significantly greater than background light signals at the greater part of the SPADs.

In FIG. 19, SPADc (4, 10) and SPADc (4, 41) were defective due to great dark counts, as indicated by being blanked out. Therefore the light-detection region includes no defective portion by not activating the defective portion. Only SPADcs (i, j) indicating around 30% or more of the greatest light-reception quantity were specified as the light-detection region RAc, as indicated by the filled-in portions. Now, the aforementioned SPADc (4, 10) is within the light-detection region RAc, but this is one missing out of 187 SPADs in the light-detection region RAc, so effects are limited.

It can be seen from FIG. 19 that the center of the light-detection region RAc is deviated from the center of the light detection portion 56 μm (i.e., 7×8 μm) in the row direction, and 77 μm (i.e., 7×11 m) the column direction. In this way, the light-detection region RAc is restricted to be small by selecting only portions where the light-reception quantity is greater, and it is an advantage of the present embodiment that positional deviation of the pulse emitter 70 and photodetector 80c can be covered over a greater area.

In the other hand, narrowing down the light-detection region RAc gives rise to concern of poorer S/N ratio. In FIG. 19, the number of SPADs in the light-detection region RAc was 188, which is approximately 76% of the first embodiment, and the background light amount decreases by the same amount. Although the photon count from background light was 4.0 on average and a maximum of 14 in the first embodiment, the photon count from background light was 3.0 on average in this configuration and a maximum of 10. On the other hand, with regard to signals from the test piece placed at a distance of 200 m, the photon count from background light was 26.7 on average, a maximum of 36 and a minimum of 16 in the first embodiment, and the photon count from background light was 21.4 on average in this configuration, a maximum of 30 and a minimum of 13.

The reflected light signals of the pulse light was approximately 80%, and the amount of decrease is smaller than the amount of decrease of background light quantity. A maximum ranging distance of 200 m was realized with this configuration as well. The reason was that even in a case where the light-detection region RAc has shifted to the edge of the light detection portion 81c as illustrated in FIG. 19, the light-detection region RAc is extended toward the center side of the light detection portion 81c and only SPADs with great signal amount are selected, thereby enabling the reflected. Light L2 of the pulse light L1 to be effectively detected while suppressing increase in background light signals.

In this way, in the configuration according to the present embodiment, optional SPADcs (i, j) of the light detection portion 81c can be selectively activated, thereby minimizing the effects of defective SPADs, and also positional deviation of the photodetector 80c and pulse emitter 70 can be handled over a broad range.

Third Embodiment

An embodiment of the present disclosure will be described with reference to FIG. 20. The configuration of a flight time measurement device 10d of an optical radar device 1d according to a third embodiment differs from the flight time measurement device 10 of the optical radar device 1 according to the first embodiment with regard to the configuration where the light emitting system and receiving system do not share an imaging optical element, as illustrated in FIG. 20, and otherwise is the same as the first embodiment.

The configuration of the flight time measurement device 10d according to the present embodiment will be described with reference to FIG. 20. FIG. 20 is a schematic diagram illustrating the configuration of the flight time measurement device 10d in the optical radar device 1d of the present embodiment.

Figure 20:
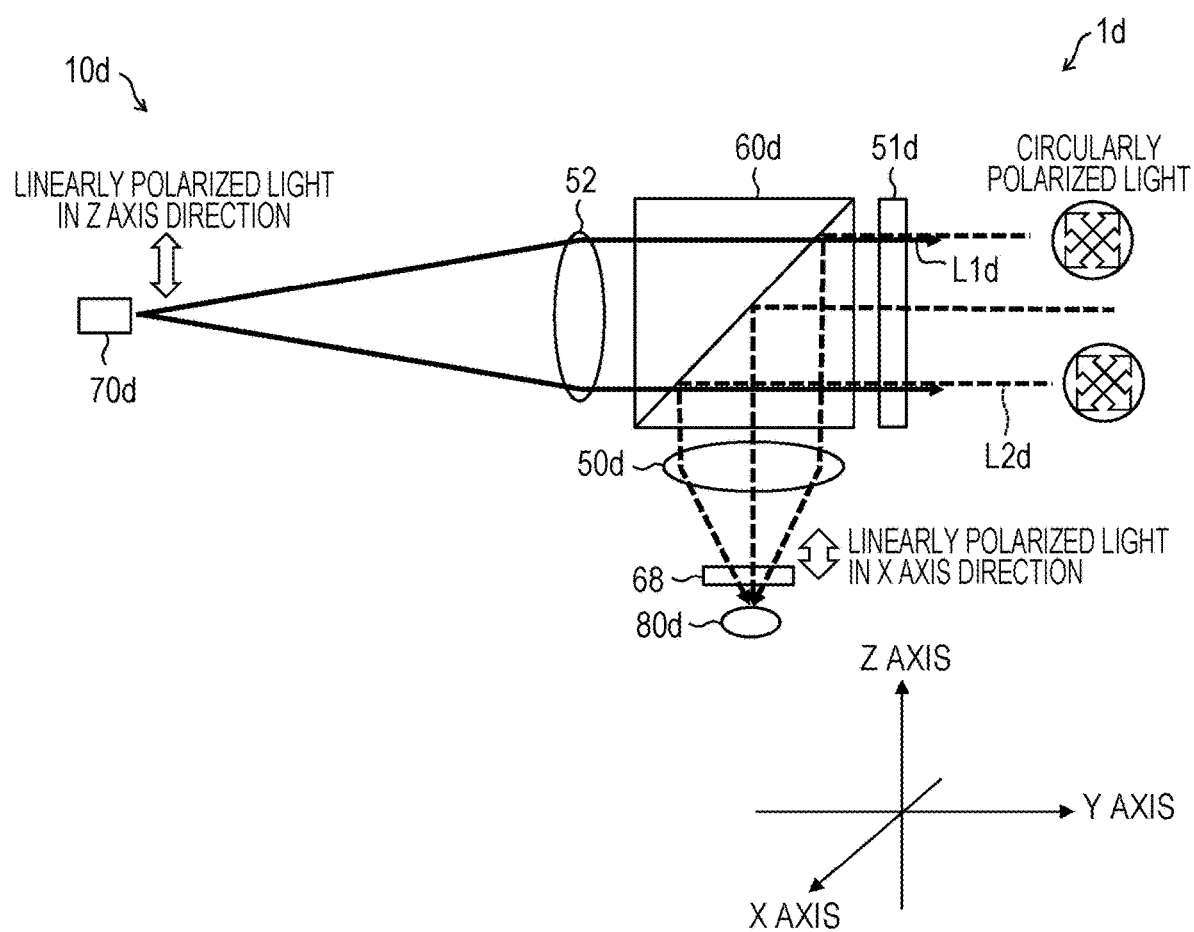
FIG. 20 is a schematic diagram illustrating the configuration of a flight time measurement device in an optical radar device according to a third embodiment of the present disclosure.

As illustrated in FIG. 20, the flight time measurement device 10d of the optical radar device 1d according to the present embodiment has a light-receiving lens 50d in the receiving system, and a collimation lens 52 in the emitting system. A polarizing beam splitter 60d and quarter wavelength plate 51d are placed in front of the light-receiving lens 50d and collimation lens 52. A photodetector 80d disposed at the focal position of the light-receiving lens 50d, while a pulse emitter 70d is disposed at the focal position of the collimation lens 52.

According to this configuration, the optical axis or pulse light L1d and the optical axis of reflected light L1d can be made to match. In this configuration, an illumination region IAd of the pulse light L1d on the object M can be controlled by the collimation lens 52, and a light-detection region RAd on the object M by the photodetector 80d can be controlled by the light-receiving lens 50d. As a result, the degree of freedom of design is greater as compared to the flight time measurement device 10 according to the first embodiment.

The following relations generally hold, where Pd represents the size of the light emitting portion of the pulse emitter 70d, θd represents the FWHM of angular distribution of light emitted from the light emitting portion, and Qd represents the size of the light detection portion of the photodetector 80d.

Diameter of pulse light L1d near flight time measurement device 10d:

$$\phi d(0)=2\cdot fd\cdot\sin(\theta d/2)$$

Diameter of illumination region IAd of pulse light L1d on object M distant from flight time measurement device 10d (distance L):

$$\phi d(L)=Pd\cdot L/fd+\phi d(0)$$

Diameter of projection portion PAd that is image of illumination region IAd projected on light detection portion:

$$I\phi d(L)=f/L\cdot\phi d(L)=Pd\cdot f/fd+2\cdot fd\cdot f\cdot\sin(\theta d/2)/L$$

, where f and fd are focal lengths of the light-receiving lens 50d and the collimation lens 52, respectively.

While the focal length fd=f in the first embodiment, and accordingly the diameter of the projection region PAd from the object M at a distance was approximately equal to Pd, f≠fd will work in this configuration, and various combinations can be made.

Now, there are cases where the working dimensions of the process for forming. SPADs are large, and the size of one SPAD is not the small size of 7 μm as in the first embodiment but only can be made to be as small as around 15 μm, for example. In a case where the size of one SPAD is around 15 μm, the number of SPADs included in the light-detection region will be ¼. As a result, in this state the number of signals when measuring will be reduced, and the S/N ratio will drop.

Accordingly, in order avoid this situation and obtain the same number of SPADs as the first embodiment, the size of the light detection portion has to be double, and the light-emission region also has to be doubled. In order to double the light-emission region, either the size Pd of the light emitting portion of the pulse emitter 70d has to be doubled, or the focal length fd has to be halved. Normally, increasing the size of the laser light-emission region is difficult, so this can be performed by halving the focal length fd of the collimation lens 52.

Conversely, in a case of using a VCSEL that has a size Pd of a larger light emitting portion of the pulse emitter 70d in order to raise the light-emission power of the pulse emitter 70d, the size of the illumination region IAd can be reduced by increasing the focal length fd of the collimation lens 52, thereby reducing the diameter of the projection region PAd.

According to the configuration of the present embodiment, the focal length of the lens 50d and the focal length of the collimation lens 52 can be suitably selected, even if the relation between the size of the light-emission region of the pulse emitter 70d and the size of the light detection portion of the photodetector 80d changes. Thus, the light detection portion of the photodetector 80d can be configured to be larger than the projection region PA where the illumination region IAd of the pulse light L1d is projected onto the photodetector 80d. As a result, even in a case where the optical axis of the photodetector 80d and the optical axis of the pulse emitter 70d deviate, a high S/N ratio can be realized by activating only the projection region PAd on the photodetector 80d.

Accordingly, precise positioning is unnecessary and assembly precision of the flight time measurement device 10d can be relaxed, so productivity can be improved while reducing assembly costs. Also, a high S/N ratio can be realized and the maximum ranging distance can be markedly improved by utilizing just the light detection portion where the reflected light L2d of the pulse light L1d reaches.

Fourth Embodiment

Figure 21:
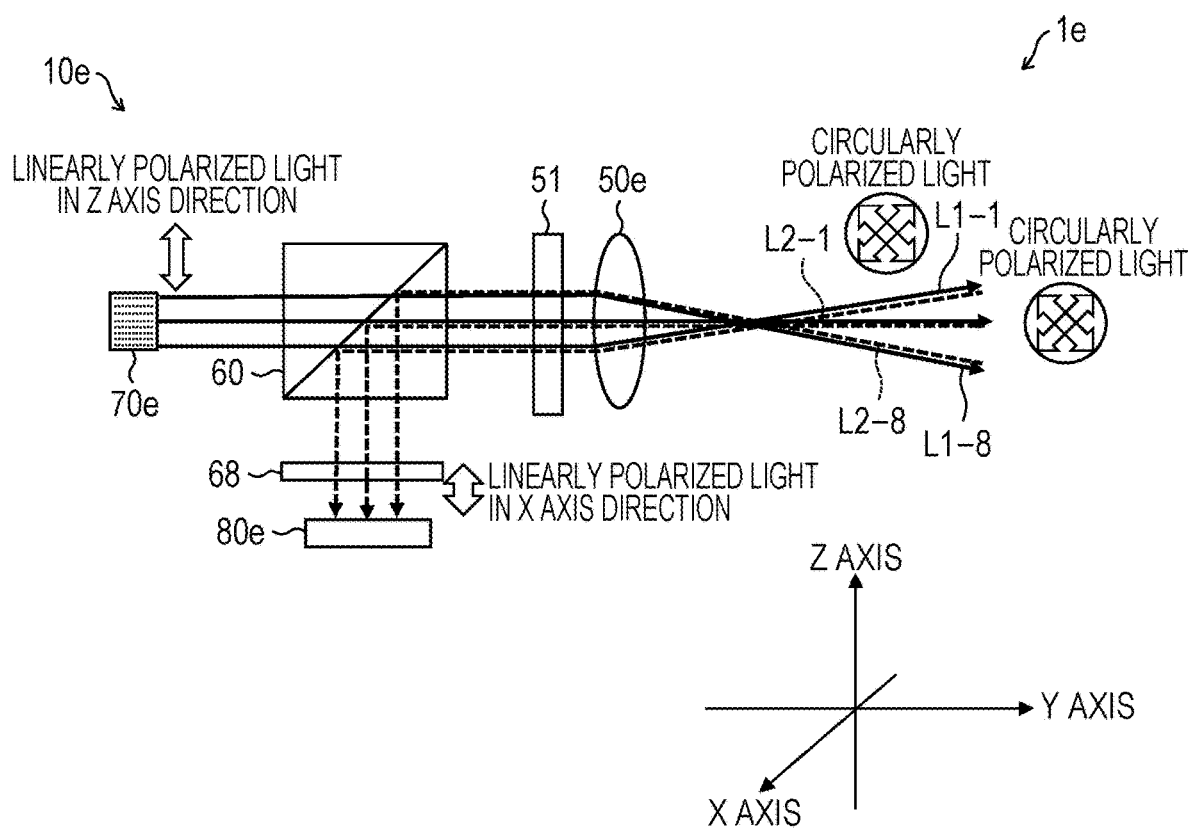
FIG. 21 is a schematic diagram illustrating the configuration of a flight time measurement device in an optical radar device according to a fourth embodiment of the present disclosure.

An embodiment of the present disclosure will be described below with reference to FIGS. 21 through 24. A flight time measurement device 10e of an optical radar device 1e according to a fourth embodiment differs from the flight time measurement device 10 of the optical radar device 1 according to the first embodiment with regard to the point that a pulse emitter 70e includes multiple light emitting portions, and a photodetector 80e includes multiple light detection portions, as illustrated in FIG. 21.

The configuration of the flight time measurement device 10e according to the present embodiment will be described with reference to FIGS. 21 through 22B. FIG. 21 is a schematic diagram illustrating the configuration of the flight time measurement device 10e in the optical radar device 1e according to the present embodiment. FIG. 22A is a frontal view showing the configuration of the pulse emitter 70e in the flight time measurement device 10e. FIG. 22B is a plan view illustrating the configuration of the pulse emitter 70e in the flight time measurement device 10e.

The optical radar device 1 according to the first embodiment is of a single-channel configuration. This has been disadvantageous in raising resolution. The present embodiment has as its primary aim raising resolution by increasing measurement points in a multi-channel configuration.

In a case of making a multi-channel configuration, case of light emitting portions of the pulse emitter 70e and light detection portions of the photodetector 80e corresponding in a one-on-one manner will be considered. In this case, the optical axes of the light emitting portions and the optical axes of corresponding light detection portions have to be matched.

However, matching the optical axis of an individual light emitting portion and the optical axis of an individual light detection portion takes positioning precision in the order of microns, and is very labor intensive. The smaller the optical radar device becomes, the larger this problem is. It is an aim of the present embodiment to improve on this point as well.

In the pulse emitter 70e of the flight time measurement device 10e according to the present embodiment, the pulse emitter 70e has multiple light emitting portions, and the photodetector The has multiple light detection portions, as illustrated in FIG. 21. Specifically, the pulse emitter 70e in the flight time measurement device 10e of the present embodiment includes, for example, eight light emitting portions 78-1 through 78-8, as illustrated in FIGS. 22A and 22B. It should be noted, however, that the pulse emitter 70e is not necessarily restricted to the eight light emitting portions 78-1 through 78-8, and any number may be used as long as two or more, for example.

In detail, the pulse emitter 70e has a light emitting layer 72 between an N layer 71 and a P layer 73, as illustrated in FIG. 22A. The N layer 71 includes an N-type gallium arsenide (GaAs) substrate and an N-type layer grown thereupon. The light emitting layer 72 and P layer 73 are sequentially epitaxially grown, thereby forming ridges 77-1 through 77-8 and P electrodes 76-1 through 76-8 corresponding to the light emitting portions 78-1 through 78-8. An N electrode 75 is formed on the rear face of the N layer 71, and an insulating film 74 covers between the ridges 77-1 through 77-8. The ridges 77-1 through. 77-8 are disposed in parallel at equal intervals R from each other.

The center line of the ridges 77-1 through 77-8 intersect edge faces 79F and 79B, as illustrated in FIG. 22B. The edge face 79F is the light-emission direction. The pulse emitter 70e is disposed with the edge face 79F perpendicular to the optical axis of the emitting system, and with the ridges 77-1 through 77-8 parallel thereto.

FIG. 21 illustrates an example of a case where the light emitting portion. 78-3 is on the optical axis of the pulse emitter 70e, and $Zm=(m-3) \cdot R$ holds where $Zm$ represents the distance of a light emitting portion 78-$m$ (where m is any integer of 1 through 8) from the optical axis. As a result, light emitted from the light emitting portions 78-$m$ passes through the polarizing beam splitter 60, quarter wavelength plate 51, and lens 50e, and illuminates the object M. At this time, the light emitted from each of the light emitting portions 78-$m$ are emitted to the object M at mutually different angles from the lens 50e in the Z axis direction.

With pulse light emitted from light emitting portions 78-$m$ as pulse light L1-$m$, a relation of $\tan(Am)=Zm/f$ holds, where $Am$ represents the angle between the direction of travel of pulse light L1-$m$ as to the Y axis. The light emitting portions 78-$m$ each emit light by current flowing between corresponding P electrodes 76-$m$ and the common N electrode 75. Sequential emission is assumed here.

The pulse emitter 70e preferably includes a driving circuit for the light emitting portions 78-$m$. Note that the driving circuit has been omitted from FIG. 20. The power source for the emission is supplied from a control-and-power-source unit 20e, and pre-emission charging operations and emission operation timings are also controlled by the control-and-power-source unit 20e.

Figure 23:
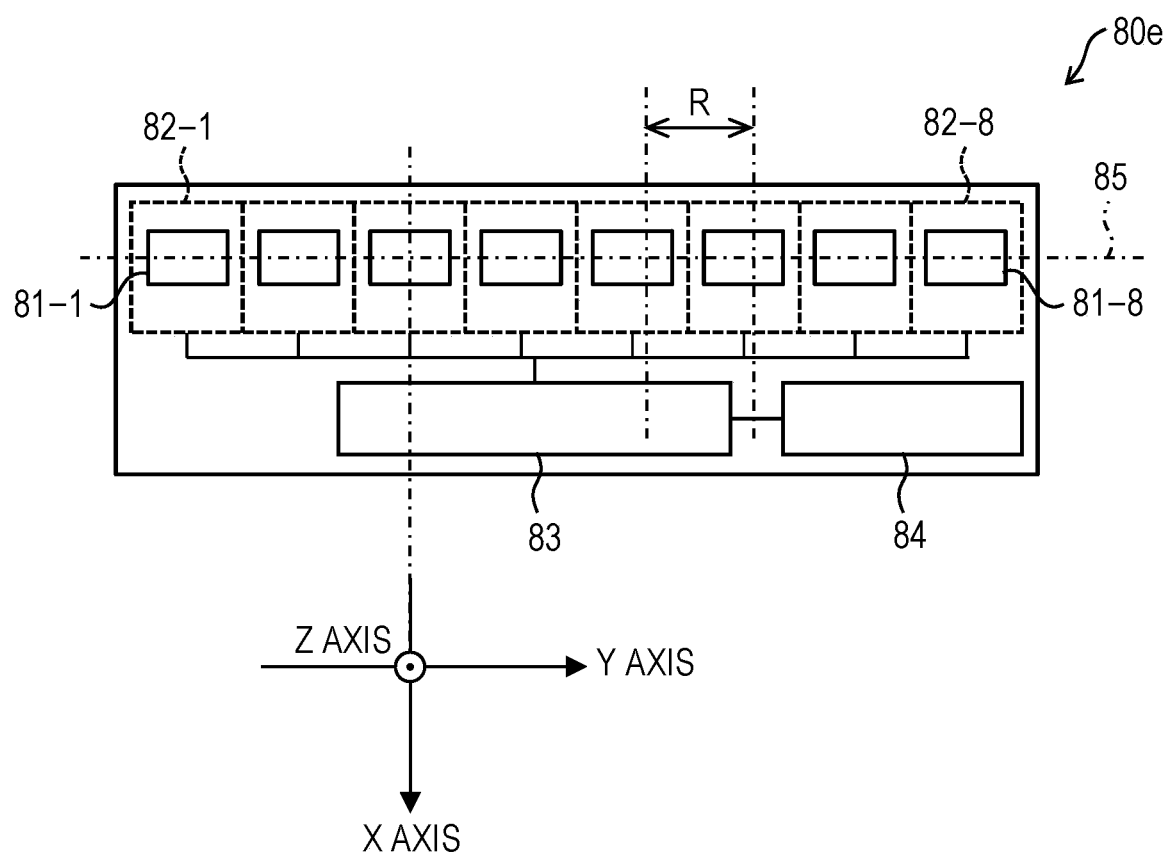
FIG. 23 is a schematic diagram illustrating the configuration of a photodetector in the optical radar device.

FIG. 23 illustrates the configuration of the photodetector 80e. The photodetector 80e has eight light detection portions 81-1 through 81-8, corresponding to the pulse emitter 70e, as illustrated in FIG. 23. The light detection portions 81-$m$ are disposed at equal intervals R from each other. The light detection portions 81-$m$ each have a light reception control unit 82-$m$. The light reception control units 82-$m$ supply electric power to the light detection portions 81-$m$, amplify and process output signals of the light detection portions 81-$m$, and then transmit to a measurement circuit 83. The measurement circuit 83 obtains the flight time Tm for each light detection portion 81-$m$, and sends this to a control-and-input/output-and-power-source unit 84. The electric power supply and timing control of the photodetector 80e is performed by the control-and-power-source unit 20e. Note that starting of light reception after pulse emission may be controlled by directly sending a timing signal from the pulse emitter 70e.

The photodetector 80e is disposed perpendicular to the Z axis so that a center line 85 of the light detection portions 81 is parallel to the optical axis of the lens 50e, as illustrated in FIG. 21. The center of the optical axis of the receiving system is disposed so as to be at the center of the light detection portion 81-3, so as to correspond to the pulse emitter 70e illustrated in FIG. 21 in a one-on-one manner. The coordinates Ym with the center of the optical axis of the receiving system of the light detection portion 81-$m$ as a reference is expressed as $Ym=(m-3) \cdot R$.

Monolithic forming of the pulse emitter 70e and photodetector 80e enables very highly precise manufacturing, since the position relation of the light emitting portions 78-$m$ and light detection portion 81-$m$ are decided by the precision of photolithography technology of semiconductor industry. In the present embodiment, small parts such as individual light emitting portions and light detection portions do not have to be individually installed with high precision, and a pulse emitter 70e and photodetector 80e that are much larger than individual light emitting portions and light detection portions can be installed with high precision. This makes manufacturing of the flight time measurement device 10e markedly easier. This advantage becomes even more pronounced in a case of increasing the number of light emitting portions and light detection portions to 16, 32, 64, and so forth, to raise resolution, in particular. Accordingly, manufacturing of the flight time measurement device 10e is easy in the configuration according to the present embodiment, occurrence of defects is suppressed, and manufacturing can be performed at low costs.

Note that the configuration of the individual light detection portions 81-$m$ of the photodetector 80e according to the present embodiment is the same as the configuration of the light detection portion 81 of the photodetector 80 according to the first embodiment, or the configuration of the light detection portion 81c of the photodetector 80c according to the second embodiment. The light reception control units 82-$m$ include at least the row selecting circuit 92 and column selecting circuit 91 in the same way as in the first embodiment. The light reception control units 82-$m$ may, in the same way as in the first embodiment, include the column counter CTj, summation circuit 93, and related control circuits.

The light detection portions 81-$m$ according to the present embodiment have illumination regions IA-m from the object M according to corresponding light emitting portions 78-$m$ that are larger than the projection regions PA-m projected on the light detection portions 81-$m$ by the lens 50e, and moreover, actual light detection can be performed with only portions overlaying the projection regions PA-m activated. Accordingly, when installing the pulse emitter 70e and photodetector 80e, positional deviation from the designed position that may occur between the pulse emitter 70e and photodetector 80e can be corrected by the light detection portions 81-$m$.

Multiple pairs of the pulse emitter 70e and photodetector 80e, illustrated in FIGS. 22A and 23, respectively, may be installed for a flight time measurement device. For example, serially arraying two light emitting devices having the eight light emitting portions illustrated in FIGS. 22A and 22B allows this arrangement to be used as a pulse emitter having a total of sixteen light emitting portions. At the same time, serially arraying two light receiving devices having the eight light detection portions illustrated in FIG. 23 allows this arrangement to be used as a photodetector having a total of sixteen light detection portions. Although the number of manufacturing steps is twice that of a case of using one device each, pulse emitters and photodetectors having twice the resolution can be easily manufactured, without having to develop a device having sixteen light emitting portions or light detection portions.

In order to enable this way of usage, the distance from the center of the ridge 77-1 and the ridge 77-8 at the ends to the ends of the chip preferably is R/2 or less, and the distance from the center of the light detection portion 81-1 and the light detection portion 81-8 at the ends to the ends of the chip preferably is R/2 or less.

In the present embodiment, the pulse emitter 70e was configured with the width of each of the ridges 77-1 through 77-8 being 200 µm, the array pitch of the ridges being R=350 µm, the light-emission wavelength of the light emitting Portions 78-1 through 78-8 being 905 nm±1 nm, and the peak power being 31 W±1 W, and was driven at a pulse width of 6 nsec, for example.

The photodetector 80e was formed on a silicon substrate. The light detection portions 81-1 through 81-8 were disposed at R=350 µm, which is the same as the array pitch of the light emitting portions. The light detection portions 81-$m$ were of the same configuration as the light detection portion 81 in the first embodiment. Note however, due to the array pitch of R=350 µm, the number of SPADs laid out was 21×43=903 for example, and the size of the light detection portions 81-$m$ was 147 µm×301 µm. The light reception control units 82-$m$ include the row selecting circuit 92, column selecting circuit 91, and column counters CTj according to the first embodiment. The measurement circuit 83 included the functions of the summation circuit 93 and ToF measuring unit 94, and the control-and-input/output-and-power-source unit 84 included the functions of the control circuit 95. That is to say, the photodetector 80e is an aggregation of the functions of eight light detection portions 81 of the photodetector 80 at least, sharing ToF measurement functions. The light detection portions 81-$m$ can each have set thereto the light-detection region RA-m covering the projection region PA-m from a distant object M from corresponding light emitting portions 78-$m$.

In the present embodiment, an interference filter having a central wavelength transmission band of 905 nm, and a transmission band width of 45 nm, for example, was used as the optical band-pass filter 68 illustrated in FIG. 21. The lens 50e had a focal length of 40 mm and f-number of 1.8 (optical aperture of 22.2 mm). A cubic polarizing beam splitter, 15 mm on each side, was used for the polarizing beam splitter 60, with the center thereof disposed at a position 20 mm from the lens 50e. The photodetector 80e was disposed at the focal position of the lens 50e, via the optical band-pass filter 68, quarter wavelength plate 51, and polarizing beam splitter 60. In the same way, the pulse emitter 70e was disposed at the focal position of the lens 50e, via the quarter wavelength plate 51 and polarizing beam splitter 60. The angle of divergence of the pulse light after passing the lens 50e was around 0.29 degrees. The pulse lights L1-1 through L1-8 from the light emitting portions 78-1 through 78-8 were each emitted at deflection angles of +1.0 degrees, +0.5 degrees, 0 degrees, −0.5 degrees, −1.0 degrees, −1.5 degrees, −2.0 degrees, and −2.5 degrees, toward the Z axis side from the Y axis direction.

The light detection portions 81-1 through 81-8 receive the reflected lights L2-1 through L2-8 corresponding to the pulse lights L1-1 through L1-8. The light emitting portions 78-1 through 78-8 emit light in order, and the light detection portions 81-1 through 81-8 receive light correspondingly. Accordingly, the light detection portion and light emitting portion activated at the same time are a pair. The SPADs of the light detection portion 81-$m$ selected by the control-and-input/output-and-power-source unit 84 received supply of electric power from the light reception control unit 82-$m$, by signals from the control-and-power-source unit 20.

Measurement of eight points at the same time was successfully performed by sequentially repeating the above-described measurement. In this case, the angular resolution in the Z axis direction was 0.5 degrees. However, the angular resolution (R/f (rad)) in the Z axis direction can be controlled by the focal length f of the lens 50e and the pitches R of the light emitting portions and light detection portions. For example, the angular resolution can be made smaller by using a lens 50e with a long focal length f.

In the present embodiment, a maximum ranging distance equivalent to that of the first embodiment was realized by sequentially driving eight channels. At this time, the range of positional deviation correction was narrowed by an amount equivalent to the reduction in length of one side of the light detection portions 81-$m$, but there was no deterioration in the maximum ranging distance even though there was assembly error, due to suitably setting the light-detection regions RA-m.

In this way, the optical radar device 1e according to the present embodiment has multiple light emitting portions and multiple light detection portions for improving angular resolution, and it is a feature thereof that the maximum ranging distance is long, and manufacturing is easy.

In the present embodiment, the array pitch of the light emitting portions 78-$m$ of the pulse emitter 70e was constant. As a result, the array pitch of the light detection portions 81-$m$ of the photodetector 80e also was constant. However, the array pitch does not necessarily have to be constant, and various modifications can be made. For example, the distance between adjacent light emitting portions may be changed to be shorter at the middle portion of the pulse emitter 70e as compared to the peripheral portions, in order to raise the resolution at the center portion of the field of view, and lower the resolution at the peripheral portions. In this case, the coordinates Ym of the light detection portions 81-$m$ of the photodetector 80e have to be equal to the coordinates Zm of the corresponding light emitting portions 78-$m$.

Although a case has been illustrated in the present embodiment where the light emitting portions 78-$m$ of the pulse emitter 70e and the light detection portions 81-$m$ of the photodetector 60e correspond in a one-on-one manner, a configuration where one-on-two, or the like, may be made. For example, in a case where raising the angular resolution very high is desired, light detection portions 81-$ma$, 81-$mb$, 81-$mc$, and so forth may be set as to the light emitting portions 78-$m$.

Modification

Figure 24:
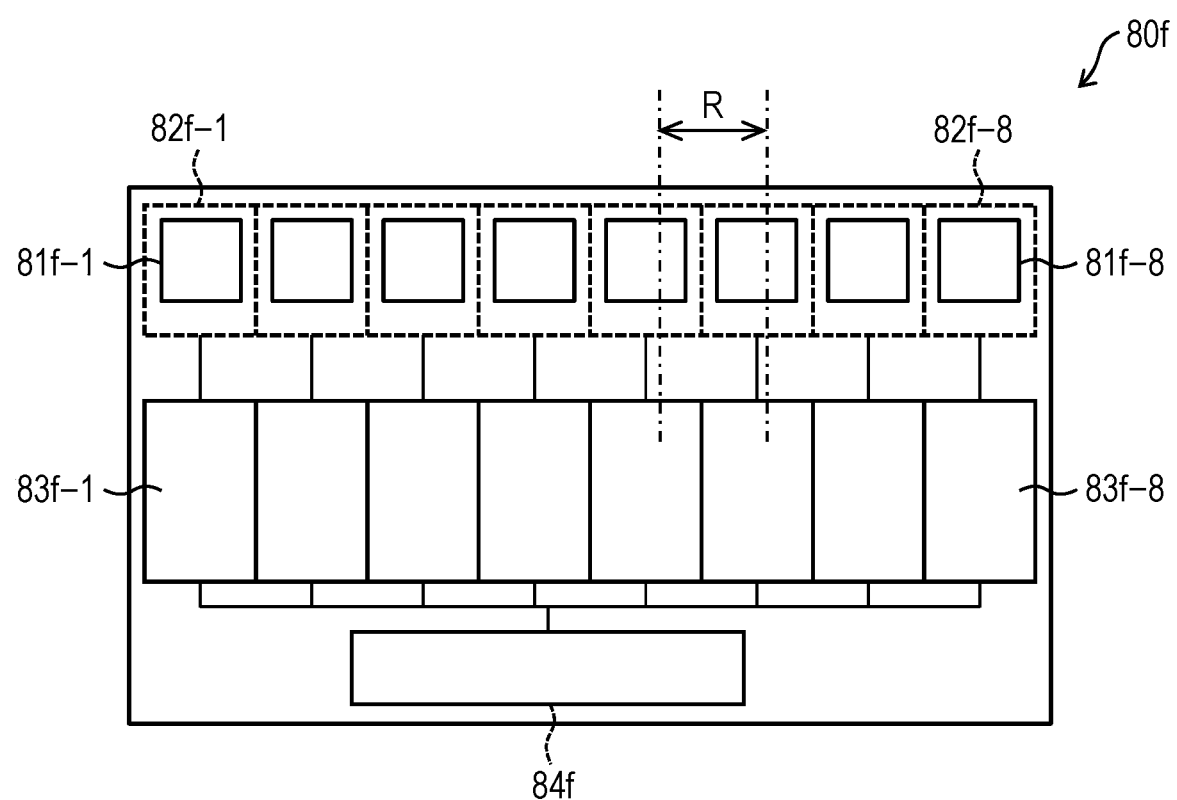
FIG. 24 is a schematic diagram illustrating the configuration of a photodetector in a modification of the optical radar device according to the fourth embodiment of the present disclosure.

As a configuration of an optical radar device if in a modification of the fourth embodiment, multiple measurement circuits 83$f$-1 through 8 (eight in FIG. 24) may be prepared corresponding to light detection portions 81$f$-1 through 8, as illustrated in FIG. 24. The configuration of the optical radar device 1$f$ in the modification of the fourth embodiment will be described with reference to FIG. 24. FIG. 24 is a schematic diagram illustrating the configuration of a photodetector 80$f$ of the optical radar device 1$f$ in the modification of the fourth embodiment.

The photodetector 80$f$ of the optical radar device 1$f$ according to the modification of the present embodiment is the same with the photodetector 80e with regard to the point that there are multiple light detection portions 81$f$-1 through 81$f$-8 and light reception control units 82$f$-1 through 82$f$-8 (eight in FIG. 24). However, there is a difference in that multiple (eight in FIG. 24) measurement circuits 83$f$-1 through 83$f$-8 provided corresponding with the light detection portions 81$f$-1 through 81$f$-8.

That is to say, the light detection portions 81$f$-$m$, light reception control units 82$f$-$m$, and measurement circuits 83-f-m have the same functions of the Eight detection portion 81 of the photodetector 80 according to the first embodiment or the light detection portion 81c of the photodetector 80c according to the second embodiment, and can be operated at the same time. In the modification of the present embodiment, the appearance of the pulse emitter 70f no different to that in FIGS. 22A and 22B, but the multiple (eight in the present modification) light emitting portions 78f-1 through 78f-8 can emit light simultaneously. The light detection portions 81f-1 through 81f-8 can also receive light simultaneously.

Although the pairs of light emitting portions and light detection portions were operating one pair at a time in the fourth embodiment, these can operate simultaneously in the present modification. Accordingly, measurement time can be shortened. Further, the number of times of measurement can be increased and measurement results added, to improve measurement precision.

Fifth Embodiment

Figure 25:
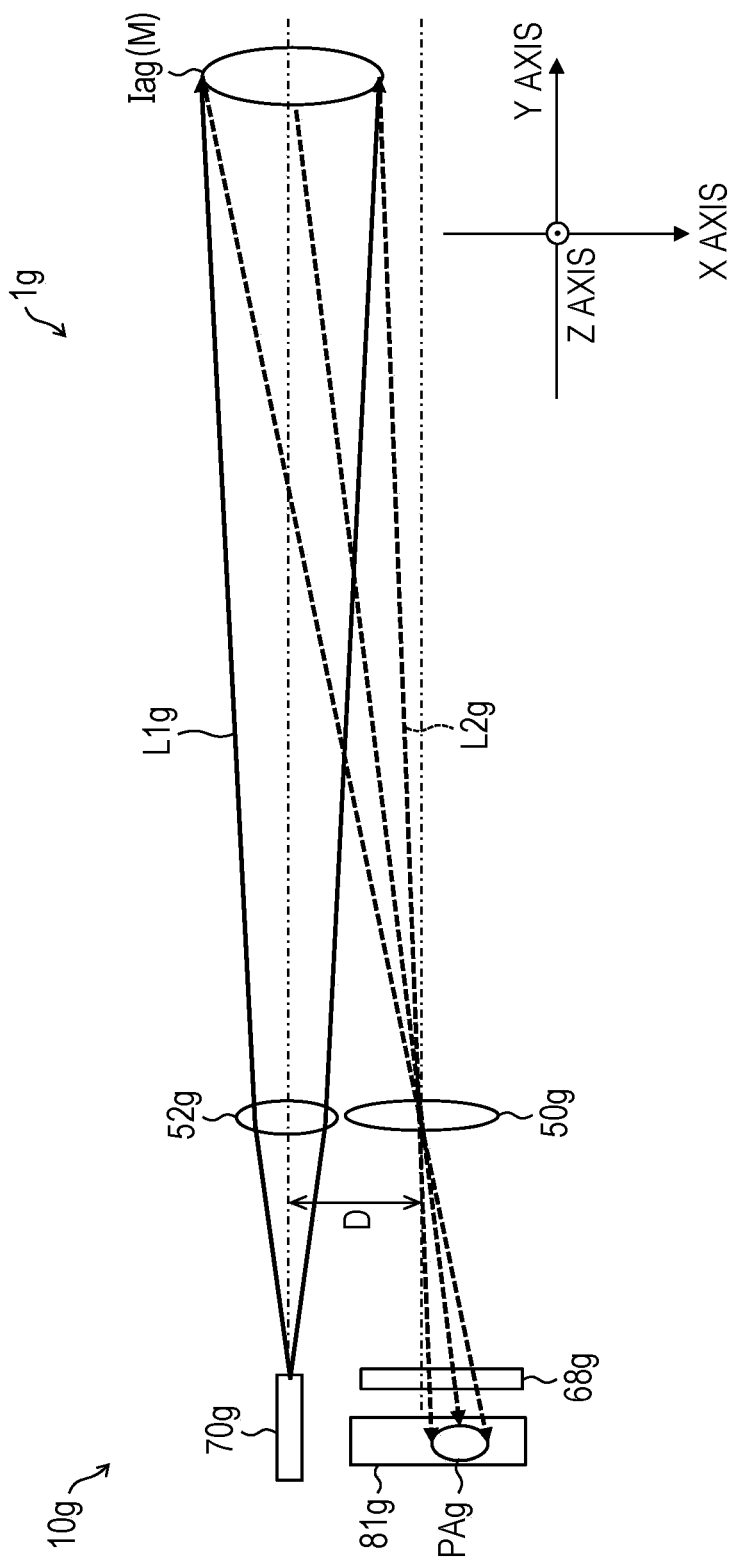
FIG. 25 is a schematic diagram illustrating the configuration of a flight time measurement device of an optical radar device according to a fifth embodiment of the present disclosure.
Figure 26:
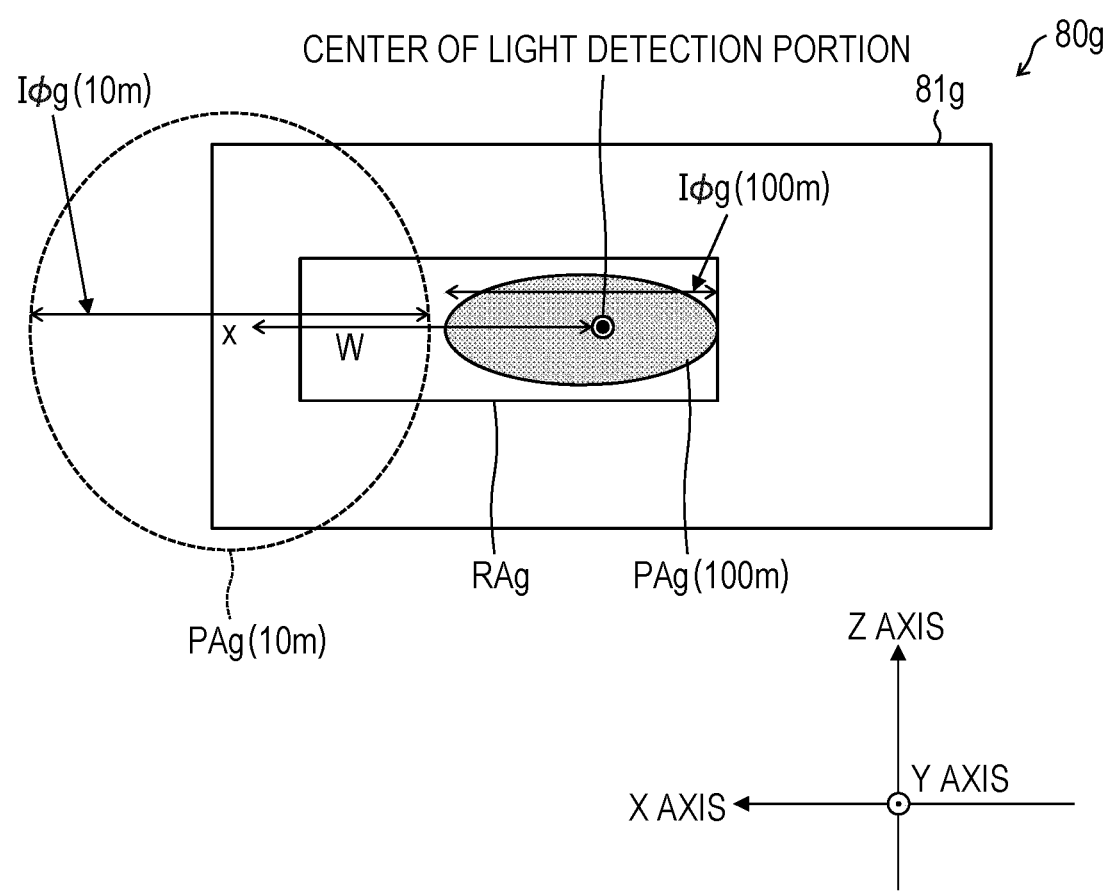
FIG. 26 is a schematic diagram illustrating the relation between a projection portion of a light illumination region and light-detection region of the photodetector in the optical radar device.

An embodiment of the present disclosure will be described with reference to FIGS. 25 and 26. A flight time measurement device 10g of an optical radar device 1g according to a fifth embodiment has a configuration where the configuration is the same as the flight time measurement device 10d in the optical radar device 1d according to the third embodiment in that the emitting system and the receiving system do not share an optical element, as illustrated in FIG. 25. That is to say, the receiving system has a light-receiving lens 50g, and the emitting system has a collimation lens 52g. However, the present embodiment differs from the third embodiment in that the polarizing beam splitter 60d is not used, with the optical axis of the emitting system and the optical axis of the receiving system being separately disposed.

The configuration of the flight time measurement device 10g in the optical radar device 1g according to the present embodiment will be described with reference to FIGS. 25 and 26. FIG. 25 is a schematic diagram illustrating the configuration of the flight time measurement device 10g of the optical radar device 1g according to the present embodiment. FIG. 26 is a schematic diagram illustrating the relation between the projection portion of the light illumination region and the light-detection region of a photodetector 80g in the optical radar device 1g.

The flight time measurement device 10g according to the present embodiment does not use the polarizing be splitter 60d, with the optical axis of the emitting system and the optical axis of the receiving system being separately disposed, as illustrated in FIG. 25. Description will be made regarding the present embodiment assuming a case where e optical axis of the emitting system and the optical axis of the receiving system are parallel to each other.

For example, even if the optical axis of the emitting system and the optical axis of the receiving system are parallel with each other at the stage of designing, there is little chance that both optical axes will be completely parallel at the stage of actually manufacturing the flight time measurement device 10g, due to variance in attachment precision of the lens 50g, collimation lens 52g, pulse emitter 70g, and photodetector 80g, and may even cross each other. The present embodiment aims to realize highly efficient production of the flight time measurement device 10g with a long maximum ranging distance, even if there is such variance. The present embodiment also does not have to use the polarizing beam splitter 60d and quarter wavelength plate 51d, so the structure is simplified and manufacturing costs can be reduced.

The following relations generally hold, where Pg represents the size of the light emitting portion of the pulse emitter 70a, θg represents the FWHM of angular distribution of light emitted from the light emitting portion, and D represents the distance between the optical axis of the light-receiving lens 50g and the optical axis of the collimation lens 52g, for example.

Diameter of pulse light near flight time measurement device 10g:

$$\phi g(0)=2 \cdot fg \cdot \sin(\theta g/2)$$

Diameter of illumination region IAg of pulse light L1g on object M distant from flight time measurement device 10g (distance A):

$$\phi g(L)=Pg \cdot L/fg+\phi g(0)$$

Diameter of projection portion PAg of illumination region IAg projected on light detection portion 81g:

$$I\phi g(L)=f/L \cdot \phi g(L)=Pg \cdot f/fg+2 \cdot fg \cdot f \cdot \sin(\theta g/2)/L,$$

where f and fg are focal lengths of the light-receiving lens 50g and the collimation lens 52g, respectively.

In the present embodiment, the optical axis of the emitting system and the optical axis of the receiving system do not overlap, so the center of the projection region. PAg does not fall on the optical axis of the light-receiving lens 50g, and the following shift W occurs.

Distance between center of projection portion PAg of illumination region IAg projected at light detection portion 81g, and optical axis of light-receiving lens 50g:

$$W=D/L \cdot f$$

Now, if the distance D is 30 mm, the distance L is 100 m, and the focal length f=75 mm, the distance W=22.5 μm. Accordingly, if the object M is at a distance, the shift is within the magnitude of the positional deviation correction range assumed in the first embodiment and second embodiment, and if the photodetector 80g has the same configuration as that of the photodetector 80 or photodetector 80c, the maximum ranging distance can be increased in the same way.

However, the distance W changes in accordance with the distance L to the object M as illustrated in FIG. 25, so measures have to be taken regarding short distances. At great distances, f/L·φg(0) that is the second term of Iφg(L) is negligible, so the magnitude of the projection region PAg is a constant Pg·f/fg that is decided by the ratio of the size Pg of the light emitting portion of the pulse emitter 70g as to the focal lengths of the two lenses, i.e., the collimation lens 52g and light-receiving lens 50a.

In the other hand, when the distance L is small, the second term becomes large, so the size of the projection region increases, and also the center thereof moves by the distance W in the X axis direction. Accordingly, the light-detection region PAg of the light detection portion 81g is enlarged in the direction where the projection region PAg exists at the short-distance side, while covering the projection region PAg at the target maximum ranging distance. Accordingly, the object M can be captured from far to near.

With regard to the object M at a distance, portions other than the projection region PAg are included in the light-detection region, so there is some deterioration in S/N ratio, but from far to near can be measured with single photodetector 80g. On the other hand, with regard to the object M up close, the entire projection region PAg cannot be covered, but light reception efficiency is high since the distance is short. Accordingly, sufficient signal amount can be obtained even with a relatively narrow light-detection region.

An edge emitting laser is used in the pulse emitter 70g producing the projection region PAg illustrated in FIG. 25, and the emitting layer is positioned so as to be parallel to the X axis. This layout gives the projection region PAg an elliptic shape that is long in the X axis direction, as illustrated in FIG. 26, at a distance. On the other hand, the projection region PAg moves in the X axis direction at close distances, so expansion of the light-detection region can be reduced, because RAg should be extended in X axis direction to cover PAg of distant object. That is to say, deterioration in the S/N ratio can be suppressed, and the maximum ranging distance can be increased.

In a case where the emitting layer of the edge emitting laser is to be disposed parallel to the Z axis, the light-detection region has to be greatly expanded, so this advantage is not obtainable. Accordingly, the light-emission region of the pulse emitter 70a preferably extends in parallel with the direction in which the photodetector 80g is disposed. Accordingly, preferably the edge emitting laser is disposed so that the emitting layer is parallel to the X direction, or the shape of the light-emission region of the VCSEL is slender in the X axis direction.

In order to extend the maximum ranging distance while enabling measurement at distances as close as possible with the flight time measurement device 10g, reducing the distance D between optical axes is effective, but there is a limit to how close the two lenses can be brought together. Another valid measure is to set the focal length fg of the collimation lens 52g to be as small as possible as to the focal length f of the light-receiving lens 50g. For example, if f/fg=2, the size of the projection region PAg as to the object M at a distance is twice, so the enlarging of the projection region PAg at close distances can be suppressed to half. As a result, deterioration in the S/N ratio due to the light-detection region RAg expanding can be suppressed. Accordingly, the focal length fg of the collimation lens 52g preferably is smaller than the focal length f of the light-receiving lens 50g.

In reality, the relative position of the projection region PAg as to the center of the light detection portion Big changes depending on the form of assembly error. The direction of movement also changes depending on the distance to the object M. Accordingly, the light detection portion 81g is formed sufficiently large, and the light-detection region is expanded to include part of the projection region PAg of the object M at near distances, while covering at least the projection region PAg of the object M at far distances. Accordingly, a flight time measurement device 10g that can handle from far to near, and moreover have a great maximum ranging distance, can be realized. Further, the margin regarding manufacturing error is wider, and manufacturing costs can be reduced.

Sixth Embodiment

An embodiment of the present disclosure will be described with reference to FIG. 27 below. A flight time measurement device 10h of an optical radar device according to a sixth embodiment is a combination of the flight time measurement device 10d in the optical radar device 1d according to the third embodiment, and the flight time measurement device 10e of the optical radar device 1e according to the fourth embodiment, as illustrated in FIG. 27.

That is to say, the flight time measurement device 10h according to the present embodiment differs from the flight time measurement device 10d according to the third embodiment with regard to the point that an array pitch Ra of light detection portions 81h-m of a photodetector 80h and an array pitch Rb of light emitting portions 78h-m of a pulse emitter 70h do not have to be the same. Accordingly, the degree of freedom of design can be increased with the flight time measurement device 10h according to the present embodiment.

The configuration of the flight time measurement device 10h in the optical radar device 1h according to the present embodiment will be described with reference to FIG. 27. FIG. 27 is a schematic diagram illustrating the configuration of the flight time measurement device 10h of the optical radar device 1h according to the present embodiment.

Figure 27:
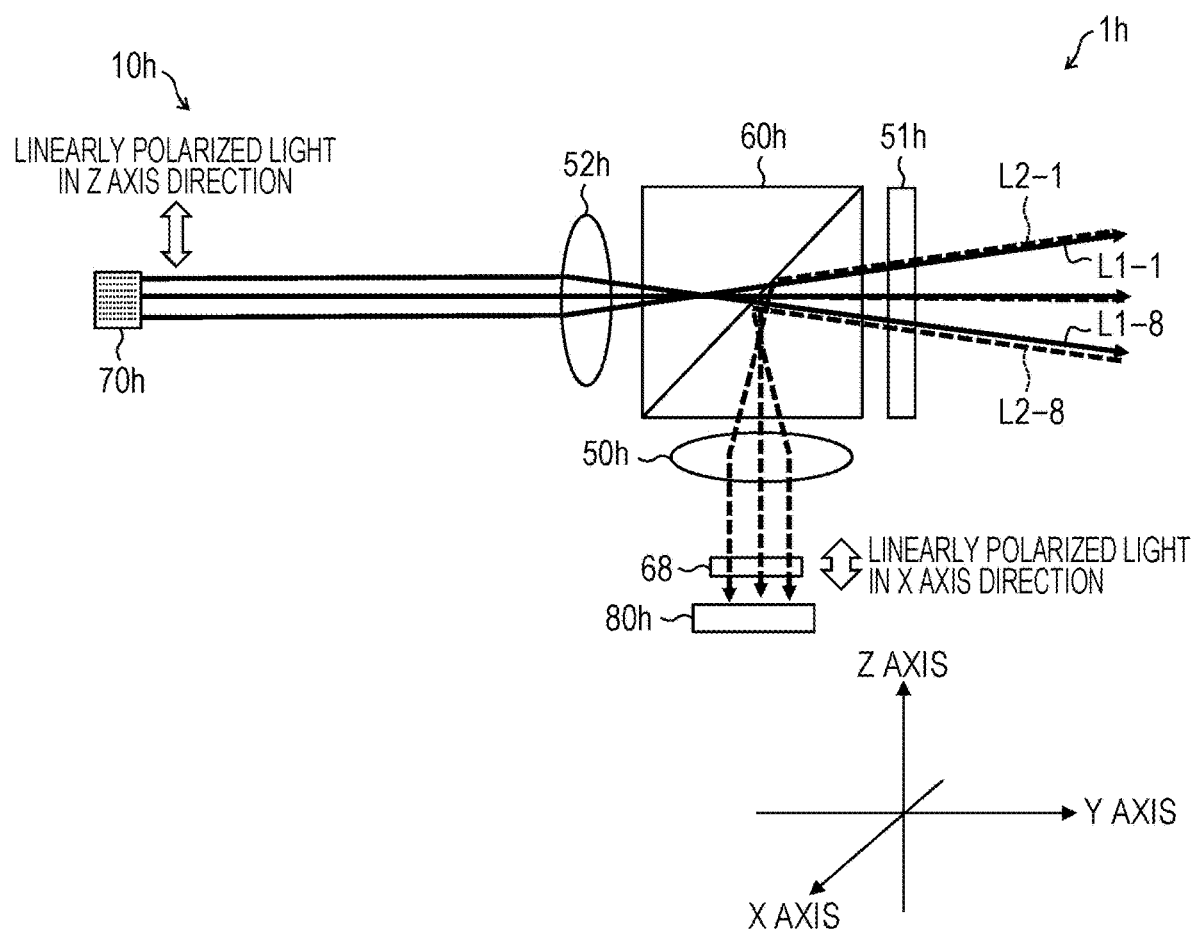
FIG. 27 is a schematic diagram illustrating the configuration of a flight time measurement device in an optical radar device according to a sixth embodiment of the present disclosure.

The array pitch Ra of the light detection portions 81h-m of the photodetector 80h and the array pitch Rb of the light emitting portions 78h-m of the pulse emitter 70h are not the same in the flight time measurement device 10h of the optical radar device 1h according to the present embodiment, as illustrated in FIG. 27. That is to say, the relation is tan (Am)=Zm/fh, where pulse light L1h-m represents pulse light emitted from the light emitting portions 78h-m of the pulse emitter 70h, Am represents the angle between the direction of travel of the pulse light L1h-m and the Y axis, Zm represents the Z-coordinate at the center of the light emitting portions 78h-m, and fh represents the focal length of a collimation lens 52h. In the other hand, Ym=f/fh·Zm holds for the reflected light L2h-m returning at the angle Am as to the Y axis. The reason is that the Y-coordinates of the light detection portions 81h-m of the photodetector 80h have a relation where tan (Am)=Ym/f.

As a result, Ra=f/fh·Rb holds, and the array pitch of the light detection portions 81h-m of the photodetector 80h can be increased or decreased as to the array pitch of the light emitting portions 78h-m of the pulse emitter 70h by adjusting the values of the light-receiving lens 50h and collimation lens 52h.

In the fourth embodiment, the light detection portion was reduced so that Ra matched Rb, but the positional deviation adjustment range became smaller. On the other hand, in the case of the configuration according to the present embodiment, Ra can be set larger than Rb by setting f/fh>1, so the light detection portion 81 of the first embodiment can be applied to the light detection portion 81-m of the fourth embodiment without redesign.

The light-detection region can be configured such that the light detection portions of the photodetector 80h according to the present embodiment include the projection region where the illumination region of corresponding pulse light on the object M at a distance is projected on the light detection portions. Accordingly, the flight time measurement device 10h having multiple channels to raise the angular resolution can also realize high S/N ratio by setting the Eight-detection region to be only on the portion of the photodetector 80h including the projection region, even in a case where the optical axis of the photodetector 80h and the optical axis of the pulse emitter 70h have deviated during assembly, and the maximum ranging distance can be markedly increased.

Accordingly, precise positioning does not have to be performed, and assembly precision of the flight time measurement device 10h can be relaxed, so production efficiency can be increased, and assembly costs can be reduced. Further, the light-receiving lens 50h and the collimation lens 52g are made to be independent form each other, enabling the pitches of the light-detection region and light-emission region to be changeable, so the degree of freedom of design of the device can be increased.

Seventh Embodiment

A embodiment of the present disclosure will be described with reference to FIG. 28. The configuration of a photodetector 80i according to a seventh embodiment is the same as the photodetector 80c according to the second embodiment, but just the operation method is different. That is to say, in the first and second embodiments, the light-detection region was uniquely decided at the manufacturing stage of the flight time measurement devices 10 and 10c, and subsequently changing the light-detection region was not assumed. Description will be made below in contrast with the second embodiment.

Figure 28:
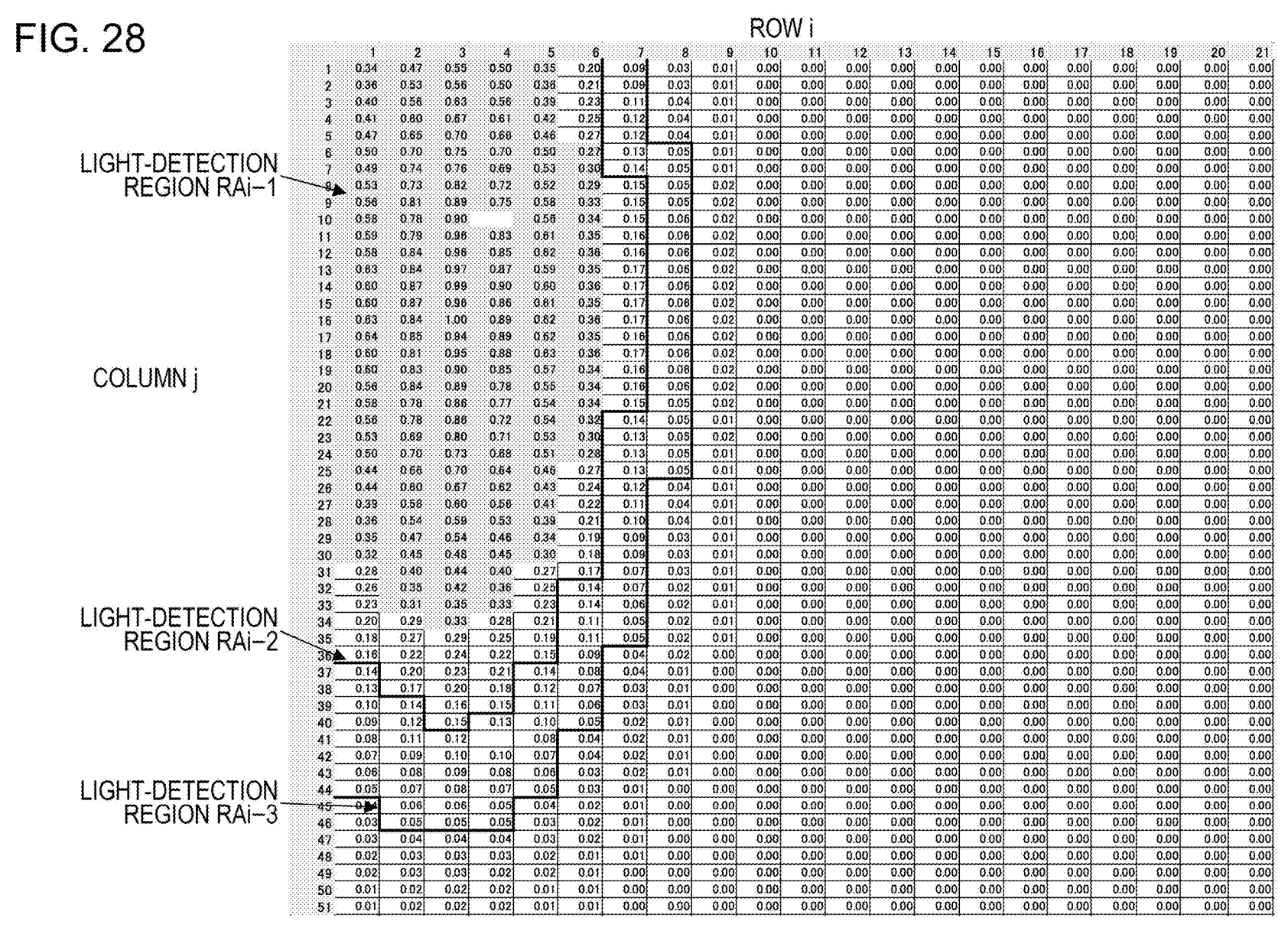

There may be multiple light-detection regions RAi-1, RAi-2, and RAi-3 in the present embodiment, as illustrated in FIG. 28. The light-detection region RAi-1 is the same as the light-detection region RAc. The light-detection region RAi-2 encompasses the Light-detection region RAi-1, and is a broader light-detection region than the light-detection region RAi-1. The light-detection region RAi-3 encompasses the light-detection region RAd-2, and is a broader light-detection region than the light-detection region RAi-2. The reception regions RAi-1, RAd-2, and RAi-3 are wider in this order, and can receive a greater amount of reflected light L2i. In the example in FIG. 28, the reception region RAi-2 can receive 11% more reflected light L2i than the reception region RAi-1, and the reception region RAi-3 can receive 17% more reflected light L2i.

The light-detection regions may be switched according to the situation and used in the present embodiment. For example, during the daytime when sunlight is bright, the light-detection region RAi-1 can be used as the light-detection region, activating only SPADs where the reflected light L2i is significantly stronger than the background light, thereby raising the S/N ratio and extending the daytime maximum ranging distance. Also, during the nighttime when there is hardly any background light, the light-detection region RAi-3 can be used as the light-detection region, thereby measuring a greater number of reflected light L2i signals, and extending the nighttime maximum ranging distance. The reception region. RAi-3 can receive 17% more signals than the light-detection region RAi-1, so the same signal amount can be measured even if the distance is 8% longer. Accordingly, the maximum ranging distance can be extended by 8% as compared to a case of using the light-detection region RAi-1.

The switching of light-detection regions described above may be realized by storing data of multiple light-detection regions in the memory 96, and the control circuit 95 writing data of "H" or "L" to the storage circuits M (i, j) of the SPADs (i, j) based on the data of the selected light-detection region. Regarding selection of the light-detection region, the photodetector 80i may be instructed regarding the light-detection region to use from an external system, in accordance with time or surrounding situations. Alternatively, distinguishing of whether daytime or nighttime may be made by the photodetector 80i measuring the output of SPADs outside of the light-detection region, and switch the light-detection region.

The light detection portion of the photodetector 80i according to the present embodiment may make up multiple light-detection regions of different sizes, so as to include the projection region where the illumination region of the corresponding pulse light L1 at the object M at a distance is projected on the light detection portion. Accordingly, the flight time measurement device 10i can also realize high. S/N ratio by setting the light-detection region to be only on the portion of the photodetector 80i including the projection region, even in a case where the optical axis of the photodetector 80i and the optical axis of the pulse emitter 70i have deviated during assembly, and the maximum ranging distance can be markedly increased.

Accordingly, precise positioning does not have to be performed, and assembly precision of the flight time measurement device 10i can be relaxed, so production efficiency can be increased, and assembly costs can be reduced. Further, switching the light-detection region in accordance with whether the surroundings are light or dark enables the maximum ranging distance when dark to be extended further beyond that during the daytime. Thus, the capabilities of the optical radar device 1i can be further improved.

Note that the embodiments and modifications disclosed herein should be considered to be exemplary in all points, and not restrictive. The scope of aspects of the present invention are laid forth in the claims and not the above description, and are intended to include all modifications within equivalent meaning and scope as the Claims.

Summarization

The photodetector 80 according to an aspect of the present disclosure is a photodetector 80 that measures flight time by the imaging optical element (lens 50) imaging reflected light L2 from an illumination region IA at the object M illuminated by pulse light L1, and the light detection portion 81 receiving the imaged light. The light detection portion 81 is formed larger than the projection region PA reflected at the illumination region IA of the object M and imaged on the light detection portion 81, and in the light detection portion 81, a portion overlaying the projection region PA is activated as a light-detection region. Note that activation means a state where incident photons can be detected.

Assembly of the flight time measurement device involves error, and there is variance in the relative positions of the photodetector and light emitter. Accordingly, in the photodetector according to an aspect of the present disclosure, the light detection portion is formed larger than the projection region of the object imaged on the light detection portion. Accordingly, at least the illumination region of the object can be imaged on the light detection portion, and imaging on the light detection portion can be realized even if there are deviations in relative positions of the photodetector and light-emitting element to the optical axes.

Accordingly, in the photodetector according to an aspect of the present disclosure, in the light detection portion, a portion overlaying the projection region is activated as a light-detection region. As a result, just the illumination region of the object is the object of measurement, so the intensity ratio as to background light can be raised, and reduction in the maximum ranging distance can be avoided. Accordingly, a light-detection region suitable for the illumination region of pulse light can be realized, and also a photodetector where positioning precision of the photodetector as to the pulse emitter is markedly relaxed can be realized.

The photodetectors 80 and 80c may further include a storage unit (memory 96) storing the light-detection region beforehand.

Accordingly, details of light-detection regions of individual photodetectors do not have to be instructed from an external system, and a portion overlaying a projection region from a reflection region in the light detection portion can be activated as a light-detection region in a sure manner.

In the photodetector 80c, the light-detection region may include no defective portions. Note that a defective portion means an incapable photoreception detection element that has a defect from the beginning and is not in a state to detect incident photons even if placed in what would originally be an activated state.

Accordingly, excluding photoreception detection elements not capable of detection avoids variation in light reception amount, and enables a photodetector with high detection precision to be realized.

In the photodetector 80, the light detection portion 81 may have photon detection elements configured of SPADs laid out as an array.

A photodetector formed of SPADs has high detection sensitivity. Accordingly, even in a case where flight time measurement has to be performed by a single pulse of light from a light emitter, for example, detection can be easily made. Also, with photodetectors formed of SPADs, large-scale arrays can be easily manufactured, so there is no large increase of costs.

In the photodetector 80, the light-detection region may be set in increments of rows and columns of the array.

Accordingly, the light-detection region that is a portion overlaying the projection region from the illumination region can be identified as a set of elements made up of rows and columns.

In the photodetector 80, the light-detection region may be set in increments of the SPADs.

Accordingly, the light-detection region that is a portion overlaying the projection region from the illumination region can be identified directly as photon detection elements made up of SPADs as a set of individual elements.

The photodetector 80 may further include a binary counter (column counter CTj) adding pulse outputs from the SPADs.

Accordingly, the count of photons of pulse output detected by the light detection portion can be counted at the binary counter.

In the photodetector 80i, the light detection portion may include a plurality of light-detection regions RAi-1, RAi-2, and RAi-3, the light-detection region RAi-1, RAc-2, or RAi-3 to be applied being selectable situationally.

Accordingly, switching the light-detection region in accordance with whether the surroundings are light or dark enables the maximum ranging distance at nighttime when it is dark to be extended further beyond that during the daytime. Further, the capabilities of the optical radar device 1i can be raised even higher.

The photodetector 80e may include a plurality of the light detection portions 81-1 through 81-8.

Accordingly, resolution can be improved by making the photodetector to be multi-channel and increasing the number of measurement points.

A flight time measurement device 10, 10a, or 10b according to an aspect of the present disclosure includes at least a pulse emitter 70, a polarizing beam splitter 60, an imaging optical element (lens 50), and the photodetector 80. The pulse emitter 70 causes pulse light L1 to pass through the polarizing beam splitter 60 and the imaging optical element (lens 50) in that order and illuminate an object M. Reflected light L2 from the object m passes through the imaging optical element (lens 50) and polarizing beam splitter 60 in that order and is imaged at the photodetector 80. The pulse emitter 70 and the photodetector 80 are each disposed at a focal position on one side of the imaging optical element (lens 50).

According to this configuration, the pulse emitter and the photodetector are each disposed at a focal position on one side of the imaging optical element. Accordingly, reflected light from an illumination region that has been illuminated on the object illuminated by pulse light can be imaged at the imaging optical element in a sure manner, and received at the light detection portion. Thus, a photodetector that realizes a light-detection region suitable for an illumination region of pulse light while markedly relaxing positioning precision of the photodetector as to a light emitter, and accordingly a flight time measurement device capable of reducing costs without reducing maximum ranging distance can be realized.

A flight time measurement device 10d and 10h according to an aspect of the present disclosure includes at least a pulse emitter 70d or 70h, a collimation lens 52 or 52h, a polarizing beam splitter 60 or 60h, an imaging optical element (light-receiving lens 50d or 50h), and the photodetector according 80d or 80h. The pulse emitter 70d or 70h causes pulse light L1d or L1-1 through L1-8 to pass through the collimation lens 52 or 52h and the polarizing beam splitter 60 or 60h in that order and illuminate an object M. Reflected light L2d and L2-1 through L2-8 from the object M passes through the polarizing beam splitter 60 or 60h and imaging optical element (light-receiving lens 50d or 50h) in that order and is imaged at the photodetector 80d or 80h. The pulse emitter 70d or 70h is disposed at a focal position on one side of the collimation lens 52 or 52h. The photodetector 80d or 80h is disposed at a focal position on one side of the imaging optical element (light-receiving lens 50d or 50h).

According to this configuration, the pulse emitter is disposed at a focal position on one side of the collimation lens, and the photodetector disposed at a focal position on one side of the imaging optical element. Accordingly, reflected light from an illumination region that has been illuminated on the object illuminated by pulse light can be imaged at the imaging optical element in a sure manner, and received at the light detection portion. Thus, a photodetector that realizes a light-detection region suitable for an illumination region of pulse light while markedly relaxing positioning precision of the photodetector as to a light emitter can be realized, and accordingly a flight time measurement device capable of reducing costs without reducing maximum ranging distance can be realized.

A flight time measurement device 10g according to an aspect of the present disclosure includes at least a pulse emitter 70g, a collimation lens 52g, an imaging optical element (light-receiving lens 50g), and the photodetector 80g. The pulse emitter 70g causes pulse light L1g to pass through the collimation lens 50g and illuminate an object M. Reflected light L12g from the object M passes through the imaging optical element (light-receiving lens 50g) and is imaged at the photodetector 80a. The pulse emitter 70g is disposed at a focal position on one side of the collimation lens 52g. The photodetector 80g is disposed at a focal position on one side of the imaging optical element (light-receiving lens 50g).

According to this configuration, the pulse emitter is disposed at a focal position on one side of the collimation lens, and the photodetector is disposed at a focal position on one side of the imaging optical element. Accordingly, reflected light from an illumination region that has been illuminated on the object illuminated by pulse light can be imaged at the imaging optical element in sure manner, and received at the light detection portion. Thus, a photodetector that realizes a light-detection region suitable for an illumination region of pulse light while markedly relaxing positioning precision of the photodetector as to a light emitter can be realized, and accordingly a flight time measurement device capable of reducing costs without reducing maximum ranging distance can be realized.

In the flight time measurement device 10e or 10h, the pulse emitter 70e or 70h may include a plurality of light emitting portions 78-1 through 78-8.

Accordingly, resolution can be improved by making the photodetector to be multi-channel and increasing the number of measurement points.

An optical radar device 1 or 1a through 1h according to an aspect of the present disclosure includes the flight time measurement device.

According to this configuration, a photodetector that realizes a light-detection region suitable for an illumination region of pulse light while markedly relaxing positioning precision of the photodetector as to a light emitter can be realized, and accordingly a flight time measurement device capable of reducing costs without reducing maximum ranging distance can be realized, thereby realizing an inexpensive optical radar device with extended maximum ranging distance.

The present disclosure is not restricted to the above-described embodiments. Various modifications may be made within the scope of the Claims, and embodiments obtained by combining technical means disclosed in different embodiments are also included in the technical scope of the present disclosure. Further, new technological features can be formed by combining technical means disclosed in different embodiments.

The present disclosure contains subject matter related to that disclosed in Japanese Priority Patent Application JP 2017-233624 filed in the Japan Patent Office on Dec. 5, 2017, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photodetector, comprising:
   a light detection portion;
   a storage unit;
   a control unit; and
   a selection portion,
   wherein the photodetector measures flight time by detecting reflected light from an illumination region of an object illuminated by pulse light, and the illumination region is imaged on the light detection portion as a projection region by an imaging optical element,
   wherein the light detection portion is formed to be larger than the projection region,
   wherein the light detection portion has photon detection elements configured of single photon avalanche diodes (SPADs) laid out as an array that has multiple rows and multiple columns,
   wherein the control unit identifies a part of the photon detection elements that overlays the projection region,
   wherein the storage unit stores a light-detection region configured of the part of the photon detection elements,
   wherein the selection portion activates only the part of the photon detection elements to configure the light-detection region, and
   wherein the control unit further:
      identifies, of the multiple columns, abnormal columns where a dark count is greater than a specification value, the dark count being a cumulative count of a part of the photon detection elements that output pulse when dark,
      performs a first test that illuminates a test piece by the pulse light in a state where all of the multiple rows are activated and only normal columns other than the abnormal columns in the multiple columns are activated, and identifies, of the normal columns, light-detection columns where a photon detection count from the reflected light is equal to or larger than a specification value in the first test,
      performs a second test that illuminates the test piece by the pulse light in a state where all of the multiple rows are activated and only the light-detection columns in the multiple columns are activated, and identifies, of the normal rows, light-detection rows where a photon detection count from the reflected light is equal to or larger than a specification value in the second test, and
      stores the light-detection region configured of the light-detection columns and the light-detection rows in the storage unit.

2. The photodetector according to claim 1, further comprising:
   a binary counter adding pulse outputs from the SPADs,
   wherein the selection portion identifies a part of the SPADs on which the illumination region is imaged based on the pulse outputs added by the binary counter, and activates the identified SPADs that form the light-detection region.

3. The photodetector according to claim 1,
   wherein the light detection portion includes a plurality of light-detection regions, the light-detection region to be applied being selectable situationally.

4. The photodetector according to claim 1,
   wherein the photodetector includes a plurality of light detection portions.

5. A flight time measurement device, comprising at least:
   a pulse emitter;
   a polarizing beam splitter;
   an imaging optical element; and
   the photodetector according to claim 1,
      wherein the pulse emitter causes pulse light to pass through the polarizing beam splitter and the imaging optical element in that order and illuminate an object,
      wherein reflected light from the object passes through the imaging optical element and the polarizing beam splitter in that order and is imaged at the photodetector, and
      wherein the pulse emitter and the photodetector are each disposed at a focal position on one side of the imaging optical element.

6. A flight time measurement device, comprising at least:
   a pulse emitter;
   a polarizing beam splitter;
   an imaging optical element; and
   the photodetector according to claim 4,
   wherein the pulse emitter includes a plurality of light emitting portions,
   wherein each of the plurality of light emitting portions of the pulse emitter causes pulse light to pass through the polarizing beam splitter and the imaging optical element in that order and illuminate an object,
   wherein reflected light from the object passes through the imaging optical element and the polarizing beam splitter in that order and is imaged at one of the plurality of light detection portions of the photodetector, wherein the pulse emitter and the photodetector are each disposed at a focal position on one side of the imaging optical element, and wherein the plurality of light emitting portions and the plurality of light detection portions correspond in a one-on-one manner.

7. An optical radar, comprising:
the flight time measurement device according to claim 5.

8. An optical radar, comprising:
the flight tie measurement device according to claim 6.

9. The photodetector according to claim 1,
wherein the part of the photon detection elements that is activated detects incident photons in case that the reflected light is illuminated and another part of the photon detection elements that is non-activated does not detect incident photons in case that the reflected light is illuminated.

* * * * *